United States Patent
Beisel

(10) Patent No.: US 12,320,667 B2
(45) Date of Patent: Jun. 3, 2025

(54) DATA-INTENSIVE ELECTRONIC MAP DATA STRUCTURES

(71) Applicant: Rivian IP Holdings, LLC, Plymouth, MI (US)

(72) Inventor: Philipp W. Beisel, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 191 days.

(21) Appl. No.: 18/091,168

(22) Filed: Dec. 29, 2022

(65) Prior Publication Data
US 2024/0219198 A1 Jul. 4, 2024

(51) Int. Cl.
| | |
|---|---|
| G01C 21/00 | (2006.01) |
| B60W 50/06 | (2006.01) |
| G01C 21/36 | (2006.01) |
| G06F 16/22 | (2019.01) |
| G06F 16/29 | (2019.01) |

(52) U.S. Cl.
CPC ......... *G01C 21/3841* (2020.08); *B60W 50/06* (2013.01); *G01C 21/3691* (2013.01); *G01C 21/3697* (2013.01); *G01C 21/3881* (2020.08); *G06F 16/2264* (2019.01); *G06F 16/29* (2019.01)

(58) Field of Classification Search
CPC ............ G01C 21/3841; G01C 21/3691; G01C 21/3697; G01C 21/3881; B60W 50/06; G06F 16/2264; G06F 16/29
See application file for complete search history.

(56) References Cited

U.S. PATENT DOCUMENTS

| | | | | |
|---|---|---|---|---|
| 9,230,177 | B2 * | 1/2016 | Dolinar | ................. F16M 11/18 |
| 10,134,278 | B1 * | 11/2018 | Konrardy | ............... G08G 1/166 |
| 2022/0244063 | A1 * | 8/2022 | Chintakindi | ....... G01C 21/3667 |

OTHER PUBLICATIONS

Dimensionless quantity. Wikipedia, The Free Encyclopedia [online]; Apr. 10, 2022, [retrieved on Apr. 21, 2022]. Retrieved from the Internet: <https://en.wikipedia.org/w/index.php?title=Dimensionless_quantity&oldid=1082019175>.
Open Location Code. Wikipedia, The Free Encyclopedia [online]; Jul. 23, 2023, [retrieved on May 2, 2023]. Retrieved from the Internet: <https://web.archive.org/web/20220531051130/https://en.wikipedia.org/wiki/Open_Location_Code>.

* cited by examiner

*Primary Examiner* — Brian P Sweeney
(74) *Attorney, Agent, or Firm* — BAKERHOSTETLER

(57) ABSTRACT

Aspects herein are directed to sensor data being received, via one or more sensors coupled to one or more vehicles, based on the one or more vehicles traversing a road in a geographical area. A portion of the sensor data is determined to exceed a threshold. The portion of the sensor data being associated with a segment of the road. Geo-coordinates associated with the segment of the road are detected. Based at least in part on the detecting of the geo-coordinates, a data structure that indicates the segment and the portion of the sensor data exceeding the threshold is populated. An indication that a first vehicle is traversing the road or that traversing the road is part of a route plan for the first vehicle is received. In response to the receiving of the indication, the data structure is derived. A modification of a vehicle operating condition is facilitated based on the segment and the sensor data in the derived data structure.

18 Claims, 18 Drawing Sheets

DATA-INTENSIVE ELECTRONIC MAP DATA STRUCTURES

INTRODUCTION

Electronic maps are digitalized representations of geographical areas. Mapping technologies use electronic maps for a variety of purposes, such as computing an efficient route for a vehicle and indicating such route at an electronic map. In another example, autonomous vehicle mapping technologies may use high definition (HD) electronic maps as a baseline for object detection and identifying road rules so that a vehicle can safely traverse an environment.

SUMMARY

Some embodiments are directed to a system that includes at least one computer processor that performs the following operations. Sensor data is received, via one or more sensors coupled to one or more vehicles, based on the one or more vehicles traversing a road in a geographical area. A portion of the sensor data is determined to exceed a threshold. The portion of the sensor data being associated with a segment of the road. Geo-coordinates associated with the segment of the road are detected. Based at least in part on the detecting of the geo-coordinates, a data structure that indicates the segment and the portion of the sensor data exceeding the threshold is populated. An indication that a first vehicle is traversing the road or that traversing the road is part of a route plan for the first vehicle is received. In response to the receiving of the indication, the data structure is derived. A modification of a vehicle operating condition is facilitated based on the segment and the sensor data in the derived data structure.

Some embodiments are directed to a computer-implemented method that includes the following operations. Sensor data is received, via one or more sensors coupled to one or more vehicles, based on the one or more vehicles traversing a road in a geographical area. A portion of the sensor data is determined to exceed a threshold. The portion of the sensor data being associated with a segment of the road. Geo-coordinates associated with the segment of the road are detected. A data structure that indicates the segment and the portion of the sensor data exceeding the threshold is populated. An indication that a first vehicle is traversing the road or that traversing the road is part of a route plan for the first vehicle is received. In response to the receiving of the indication, the data structure is derived. A modification of a vehicle operating condition is facilitated based on the segment and the sensor data in the derived data structure.

Some embodiments are directed to one or more computer storage media having computer-executable instructions embodied thereon that, when executed, by one or more processors, cause the one or more processors to perform the following operations. Sensor data is received, via one or more sensors coupled to one or more vehicles, where the sensor data associated with a road. A portion of the sensor data is determined to exceed a threshold. The portion of the sensor data being associated with a segment of the road. Geo-coordinates associated with the segment of the road are detected. A data structure that indicates the portion of the sensor data exceeding the threshold is populated. An indication that a first vehicle is traversing the road or that traversing the road is part of a route plan for the first vehicle is received. In response to the receiving of the indication, the data structure is derived. A modification of a vehicle operating condition is facilitated based on at least one of: the segment and the sensor data in the derived data structure.

DESCRIPTION OF THE DRAWINGS

Examples of aspects herein are described in detail below with reference to the attached drawings figures, wherein.

DETAILED DESCRIPTION

Figure 1:
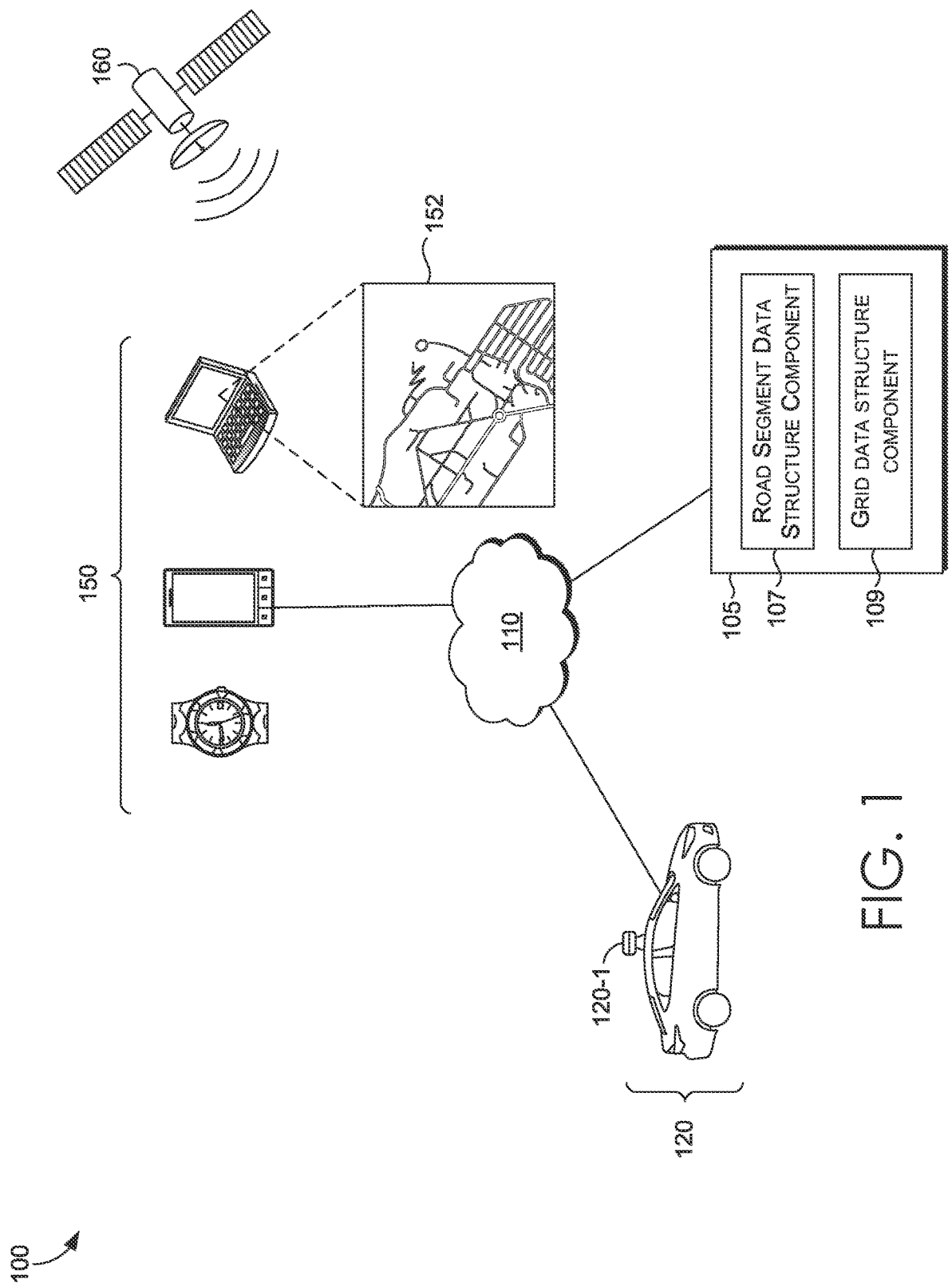
FIG. 1 is a schematic diagram of an example computing environment in which aspects of the present disclosure are employed in, according to some embodiments.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Existing mapping technologies have various technical deficiencies, such as using limited data and performing basic functionality. Specifically, for instance, these technologies fail to populate data structures representing different geographical areas of the earth with data. For example, although certain data structures that divide the earth into addressable rectangular grids exist, these data structures do not hold any useful off-road data for potential drivers or autonomous vehicles, such as the existence of an off-road (e.g., an unmarked dirt road) route option, a quantity of times vehicles have traversed off-road areas, or any other data useful for driving off-road.

In another example, these existing mapping technologies contain limited information about roads themselves, and the roads are very broadly represented (e.g., by data structures that represent the length of the entire road). In an illustrative example, consumer GPS technologies may only generically identify the possible paved roads in an electronic map, compute length of the roads, and compute traffic data in order to calculate the most efficient route to get to a location. However, such technologies and other mapping technologies fail to use other information, such as whether the road is an off-road path or is a paved street, a road comfort score for a section of the road, a road safety score for the section, how many lanes the road contains, or direction of traffic flow, among many other useful attributes.

Because of such limited data usage and data structures, these existing mapping technologies are inaccurate. For example, in calculating the most efficient route from location A to location B, because existing technologies fail to use data structures that represent a section of the earth and the corresponding attribute values, these technologies may fail to take into account a particular dirt road or newly constructed road, which may be the most efficient route to take to location B, thereby making the route calculation inaccurate.

In another example, because existing technologies use data structures that represent a length of a road or are otherwise broadly defined, they may fail to capture more granular details of smaller sections of the road, such as potholes, surface changes, or other road inefficiencies or specific traffic flow directions. In yet another example, because these technologies fail to use other data, such as whether the road is an off-road path (e.g., is a dirt road), how many lanes the road contains, direction of traffic flow, a road comfort score for a section of the road, or a road safety score for the section, they may fail to accurately compute the most efficient route, detect objects, or establish road rules.

Existing mapping technology user interfaces and corresponding human-computer interaction are also deficient. As described above, existing mapping technologies use limited data and perform basic functionality. Consequently, the user interfaces are generic, thereby leading to static human-computer interaction and user experiences. For example, these user interfaces may contain basic features, such as color-coded indicators representing traffic flow, zoom-in/out functionality to view more or less map features, or landmark buttons, to find particular categories of landmarks, such as gas stations, restaurants, parks, or hotels. However, these user interfaces currently fail to provide any other indicators, such as indicators representing how many lanes a road has, an indicator representing whether the road is an off-road dirt road or a paved street, an indicator for road safety, an indicator for road comfort, heat maps indicating how often a road is traversed, or the like. Such additional data can be useful for vehicle manufacturing users or aids the driver in deciding which road to take to get to a given location. For example, a user may avoid driving on two-lane roads at night, where one lane opposes the other lane with respect to the direction of traffic flow. However, existing technologies do not provide this information, thereby leading the user to guess if the road is safe or not.

Existing technologies are also inefficient in terms of computer resource consumption, such as input/output (I/O), latency, throughput, and the like. As described above, existing mapping technologies perform only basic functionality. As such, users have to manually formulate additional queries or other user input (e.g., navigational drilling at a user interface) in order to find the information they need to adequately choose the road to travel on. For example, using the illustration above, if the user wants to find out whether a road is just a single two-lane road, the user has to manually input additional queries at a search engine in order to locate search results that indicate how many lanes a road has. Further, often times the data the user needs is not found in any resource at all. Accordingly, the user issues unnecessary and repetitive queries, clicks, selections, or other user input.

Consequently, various computing resources are unnecessarily consumed. For example, an optimizer engine of a database manager module calculates a query execution plan (e.g., calculates cardinality, selectivity, etc.) each time a query is issued, which requires a database manager to find the least expensive query execution plan to fully execute the query. Because of the many data sets the user needs but does not have, the user must repetitively issue these queries or other user input, which decreases throughput and increases network latency. Most database relations contain hundreds if not thousands of records. Repetitively calculating query execution plans on this quantity of rows decreases throughput and increases network latency. Additionally, this increases storage device I/O (e.g., excess physical read/write head movements on non-volatile disk) because each time a user inputs this information, the computing system has to reach out to the storage device to perform a read or write operation, which is time consuming, error prone, and eventually wears on components, such as a read/write head.

Various aspects of the present disclosure improve these existing technologies by providing one or more technical solutions to one or more of the technical problems describe herein. In operation, particular embodiments are directed to deriving (e.g., via an Application Programming Interface (API) call) a data structure (e.g., multiple containers or computer objects) that represents a road segment. In some embodiments, the data structure is at least partially defined by a width of the road or a width of a respective lane of the road. For example, in some embodiments, each road segment is a quadrilateral with four vertices defined by a width of a lane, such that there are multiple stacked road segment data structures for each lane.

Particular embodiments are additionally or alternatively directed to deriving one or more other data structures, such as a grid data structure, that represent a respective section of a geographical area. The grid data structures and road segment data structures contain one or more unique attribute values for use by any application. For example, in some embodiments, the road segment data structure include unique information, such as a vehicle efficiency score for a first section of road, a vehicle wear and tear score for the first section, a road flow score for the first section, a road comfort score for the first section, and a road safety score for the first section, among others. In another example, the grid data structures include unique information, such as a location type value, and altitude of the first section, a quantity of times data was added to the first grid data structure, and vehicle identifiers, among others.

In some embodiments, such attribute values are generated based on sensor data that is detected via one or more sensors coupled to one or more vehicles as the vehicles traverse a road. In this way, the sensor data is historical data that offers clues about a given road's state or other characteristic associated with attribute values of the grid or segment data structures. For example, if multiple vehicles experienced identical accelerometer reading spikes at a first section of a road, it can be inferred that the first section is an off-road section and the comfort score will be lower.

In some embodiments, these data structures are accessed, from computer storage, in response to any corresponding user request in order to cause presentation of an indicator associated with at least one value of any of these attributes. For example, in response to receiving an indication that a user has input a particular address in a destination field, particular embodiments may access a grid data structure that includes the address and corresponding data, such as indications of whether the pathways are off-road paths or paved streets, the number of lanes of particular roads, or the like, as indicated in corresponding road segment data structures.

Various embodiments of the present disclosure improve mapping technologies via various technical solutions. For example, one technical solution is the use of data within grid data structures that represent different geographical areas of the earth. Such grid data structures hold useful off-road data for potential drivers, autonomous vehicles, or other users. For example, such attribute values can indicate: whether a path is an off-road (e.g., a dirt road) path or a paved street, an identifier that identifies a grid data structure, a direction identifier, a timestamp indicating when a set of attributes were first generated and when the set of attributes were last generated, geo-coordinates of the center point of a section of a geographical area, a location type value, and altitude of the section, a quantity of times data was added to a grid data structure, and vehicle identifiers that have traversed the section and that are responsible for respective sets of attributes, as described in more detail herein.

Another technical solution is the generation or use of road segment data structures, each of which uniquely represents a segment of a road (e.g., via a unique quadrilateral stacked on other quadrilaterals). Instead of representing a length of an entire road or otherwise broadly representing a road section, in particular embodiments, a boundary of each road segment data structure is at least partially defined by a width of the road or a width of a respective lane of the road (e.g., such as a quadrilateral). This allows for more granular attribute values to be extracted about a road, such as potholes, small uneven surfaces, or the like, as described in more detail below.

Another technical solution is the attributes or the corresponding values that these road segment data structures contain. For example, these data structures can be tagged or populated with a vehicle efficiency score for a first section of a road, a vehicle wear and tear score for the first section, a road flow score for the first section, a road comfort score for the first section, a road safety score for the first section, a suspension mode score for the first section, one or more geo-coordinates of the first section, a lane identifier that identifies one or more lanes of the first section, a direction of traffic flow of one or more lanes, an indication of whether the first section is part of an off-road path or is part of a street, and a difficulty score of the first section. Using the illustrative example above, with the use of these data structures, consumer GPS technologies may now be able to calculate the most efficient route based on other information, such as whether the road is an off-road path or is an on-road paved street, how many lanes the road contains, direction of traffic flow, a road comfort score for a section of the road, or a road safety score for the section, among many other useful attributes based on analyzing sensor data from a history of vehicle traversals.

Particular embodiments improve the accuracy relative to existing mapping technologies because of the rich attribute value data usage, street segment data structures, grid data structures, and/or functionality, For example, using the illustration above, in calculating the most efficient route from location A to location B, particular embodiments use data structures that represent a section of the earth and the corresponding attribute values, unlike existing technologies. Consequently, these embodiments take into account a particular unmarked dirt road or newly constructed road, which may be the most efficient route to take to location B.

With respect to accuracy, using the other illustration above, because particular embodiments use data structures that at are at least partially defined by a width of the road or a width of a respective lane of the road, they capture more granular details of smaller sections of the road, such as potholes, surface changes, or other road inefficiencies or specific traffic flow directions. This is different than existing technologies that might indicate that some large stretch of road (e.g., 2 miles) contains some piece of information, but the broadly defined location is too abstract to be useful to users. In yet another example, because some embodiments uses unique data, such as whether the road is an off-road path (e.g., an unmarked dirt road), how many lanes the road contains, direction of traffic flow, a road comfort score for a section of the road, or a road safety score for the section, they more accurately compute the most efficient route, detect objects, or establish road rules.

In some embodiments, another technical solution is the user interface and corresponding human-computer interaction. Instead of employing only basic user interface features, such as color-coded indicators representing traffic flow, zoom-in/out functionality, and the like, particular embodiments cause presentation of indicators associated with the one or more attributes in the grid or road segment data structures. For example, particular embodiments cause presentation of indicators representing how many lanes a road has, an indicator representing whether the road is an off-road dirt road or a paved street, an indicator for road safety, an indicator for road comfort, heat maps indicating how often a road is traversed, or the like. Such additional data aids the driver in deciding which road to take to get to a given location. For example, using the illustration above, if a user wants to avoid driving on two-lane roads at night, where one lane opposes the other lane with respect to the direction of traffic flow, particular embodiments cause presentation of an indicator indicating how many lanes a road has and the direction of traffic flow.

In some embodiments, another technical solution is the way data structures are populated—via the use of sensor data from vehicles. As described above, existing technologies only use limited data. For example, certain mapping cars with sensors may only extract information about a geographical area once or twice a year. However, various embodiments of the present disclosure can continuously or in near-real-time extract sensor data from a fleet logistics vehicles that delivery parcels or customer vehicles of the same make, which traverse roads multiple times a day. In this way, data is updated on a continual basis. Further, these vehicles can be equipped with various sensors, such as lidars, radars, object detection cameras, accelerometers, gyroscopes, and the like, which make it possible to extract rich sensor data to be used in road segment data structures and grid data structures, as described herein.

Particular embodiments also improve existing technologies with respect to computer resource consumption, such as input/output (I/O), latency, throughput, and the like. As described above, users have to manually formulate additional queries or other user input (e.g., navigational drilling at a user interface) in order to find the information they need to adequately choose the road to travel on, thereby causing decreased throughput, increased network latency, and increased I/O, among other things. However, particular embodiments automatically generate attribute values that the user would otherwise have to manually search for based on unique rule sets (e.g., whether sensor readings exceeded a threshold). For example, if an accelerometer reading spiked over a threshold for a threshold quantity of road segment data structures, then particular embodiments can generate a score indicating that the comfort score is below a threshold. An analogous comfort value would otherwise have to be manually derived from web page blogs or other resources where users indicated their comfort.

Accordingly, computing resources are not unnecessarily consumed. Specifically, an optimizer engine of a database manager module calculates a query execution plan (e.g., calculates cardinality, selectivity, etc.) on fewer or no queries, since the information is automatically generated and provided to the user. This increases throughput and decreases network latency. This is because an optimizer engine calculates query execution plans on a lower quantity of rows and less packets are sent over a network Additionally, such automatic generation and providing to the user reduces storage device I/O because the computing system has to reach out to the storage device fewer times to perform a read or write operation, and therefore wears less on components, such as a read/write head since the user is not having to manually search for the data.

Turning now to FIG. 1, a schematic diagram of an example computing environment 100 in which aspects of the present disclosure are employed in, according to some embodiments. As shown in FIG. 1, this particular computing environment 100 includes a fleet or group of vehicles 120, one or more user device's 150, and one or more computing devices (e.g., cloud compute nodes or a server), and a satellite system 160, each of which are communicatively coupled to each other via the wired and/or wireless computer network(s) 110.

The computing environment 100 is configured to produce or cause presentation of the mapping features, as indicated at the map 152 at one or more of the user devices 150 based on one or more sensors 120-1 located on each of the vehicles 120 generating road or other environment data (e.g., accelerometer, gyroscope, or GPS readings), and the computing device(s) 105 analyzing such data to generate one or more scores, as described in more detail below.

The one or more sensors 120-1 coupled to the one or more vehicles 120 are configured to detect or capture sensor data, such as time series data (e.g., near real-time data that is time ordered), as the vehicles 120 traverse an environment and then forward the time series data to the computing device(s) 105 (e.g., a big data system), where the data is recorded. Near real time in this sense can mean that the computing device(s) 105 receive the time-series data in near real time (e.g., within 10 seconds) relative to the time at which the sensors 120-1 detect or capture the data. In some embodiments, the sensors 120-1 can by any suitable sensors that capture vehicle and environment dynamics, such as one or more of: a pressure sensor, an accelerometer, a gyroscope, a geolocation sensor (e.g., GPS sensor), a radar, a lidar, a sonar, an ultrasound, and an object recognition camera.

In some embodiments, the vehicles 120 represent a fleet of logistics vehicles that are configured to deliver or pickup parcels. For example, the vehicles 120 can represent a fleet of delivery trucks with packages inside that are to be delivered to various addresses. As the vehicles 120 using their routes to go to these different locations, different sensors can be used to detect objects in a geographical environment or otherwise extract sensor data. Alternatively or additionally, in some embodiments, the vehicles 120 represent a group of vehicles of the same make or brand that are driven by customers. For example, all brand A model cars may be equipped with different sensors and for every brand A electric car sold between year 1 and 2, the data can be gathered from these sensors.

In some embodiments, the vehicles 120 additionally or alternatively represent a third party set of vehicles such that they are not affiliated with logistics vehicles, consumer vehicles of the same brand, but can be any suitable car. For example, in some embodiments, the vehicles 120 may be autonomous vehicle mapping cars that are used for no other purpose than obtaining mapping data obtained from the logistics vehicle 120.

Each of the vehicles 120 may be any suitable vehicle, such as a car, truck, an aircraft, a drone (an Unmanned Aerial Vehicle (UAV)) that travels in air space, a boat, and/or the like. In some embodiments, the vehicles 120 represent autonomous vehicles, partially autonomous vehicle, manually-driven vehicles or a combination thereof.

The computing device(s) 105 is configured to receive and subscribe to the sensor data from the vehicles 120, normalize or otherwise clean the sensor data (e.g., via Extract Transform Load (ETL)), and then score the data via the road segment attribute deriver 105-1 and the grid attribute deriver 105-2. For example, the computing device(s) 105 can compare a set of accelerometer readings against a set of rules, an object, or programmatic conditional statements to see if the readings are over a threshold (e.g., do a computer read of a lookup table or hash map data structure), and if they are over a threshold, the score may be a specific "road comfort" score. The different possible attributes, attribute values, and scores, are described in more detail below.

ETL refers to the concept of pulling (or copying) data from one or more source databases (e.g., storage 225) and writing the pulled data into a target data store (e.g., a data warehouse). Specifically, for the "Extract" operation, data (e.g., raw data) is extracted or read from one or data sources (e.g., different types of databases). For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, several unrelated documents can be joined. In another example, the Transform operation can additionally or alternatively clean, sort, validate, and/or prepare the read data. For the "Load" operation, the transformed data from the "Transform" operation is then written into a target data store. For example, using the illustration above, the joined documents can be output in a single view at the map 152.

The user device(s) 150 is configured to produce visual mapping data, such as 152, based on the scores or attribute values generated by the computing device(s) 105. For example, using the illustration above, based on a user device request to find an efficient route between point A and point B, an indicator of the road comfort score (e.g., "this road is bumpy") illustrated above may be caused to be presented at 152. The user device(s) 150 and the computing device(s) 105 may be any suitable computing devices, as described in more detail below.

In some embodiments, the computer network(s) 110 represents a local area network (LAN), a wide area networks (WAN), the Internet and/or a cellular network, amongst any of a variety of possible public and/or private networks. In some embodiments, the network(s) 110 represents or includes an Internet of Things (IOT) or Internet of Everything (IoE) network, which is a network of interconnected items that are each provided with unique identifiers (e.g., UIDs) and computing logic so as to communicate or transfer data with each other or other components. Such communication can happen without requiring human-to-human or human-to-computer interaction. For example, an IoT network may include the vehicles 120, which are equipped with one or more sensors and transmitter in order to process and/or transmit sensor data over the network(s) 110 to the computing device(s) 105. In the context of an IoT network, a computer (not shown) within the vehicles 120 can be or include one or more local processing devices (e.g., edge nodes) that are one or more computing devices configured to store and process, over the network(s) 110, either a subset or all of the received or respective sets of data to the one or more remote computing devices (e.g., the user device(s) 150 and/or the computing device(s) 105) for analysis.

In some embodiments, the local processing device(s) is a mesh or other network of microdata centers or edge nodes that process and store local data received from sensors coupled to the vehicles 120 and push or transmit some or all of the data to a cloud device or a corporate data center that is or is included in the one or more computing device(s) 105. In some embodiments, the local processing device(s) store all of the data and only transmit selected (e.g., data that meets a threshold) or important data to the computing device(s) 105. Accordingly, the non-important data or the data that is in a group that does not meet a threshold is not transmitted. For example, a lidar, radar, and/or camera sensor located within one of the vehicles 120 may sample map data but only push a portion of the map data. Accordingly, only after the condition or threshold has been met, do the local processing device(s) transmit the data that meets or exceeds the threshold to remote computing devices such that the remote device(s) can take responsive actions, such as notify a user mobile device (e.g., 150) indicating the threshold has been met and/or cause a modification of a device (e.g., an autonomous vehicle to perform an action (e.g., turn) based on the control signal received). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 110. Accordingly, in these embodiments, the one or more local processing devices can be associated with one or more gateway devices that translate proprietary communication protocols into other protocols, such as internet protocols.

Figure 2:
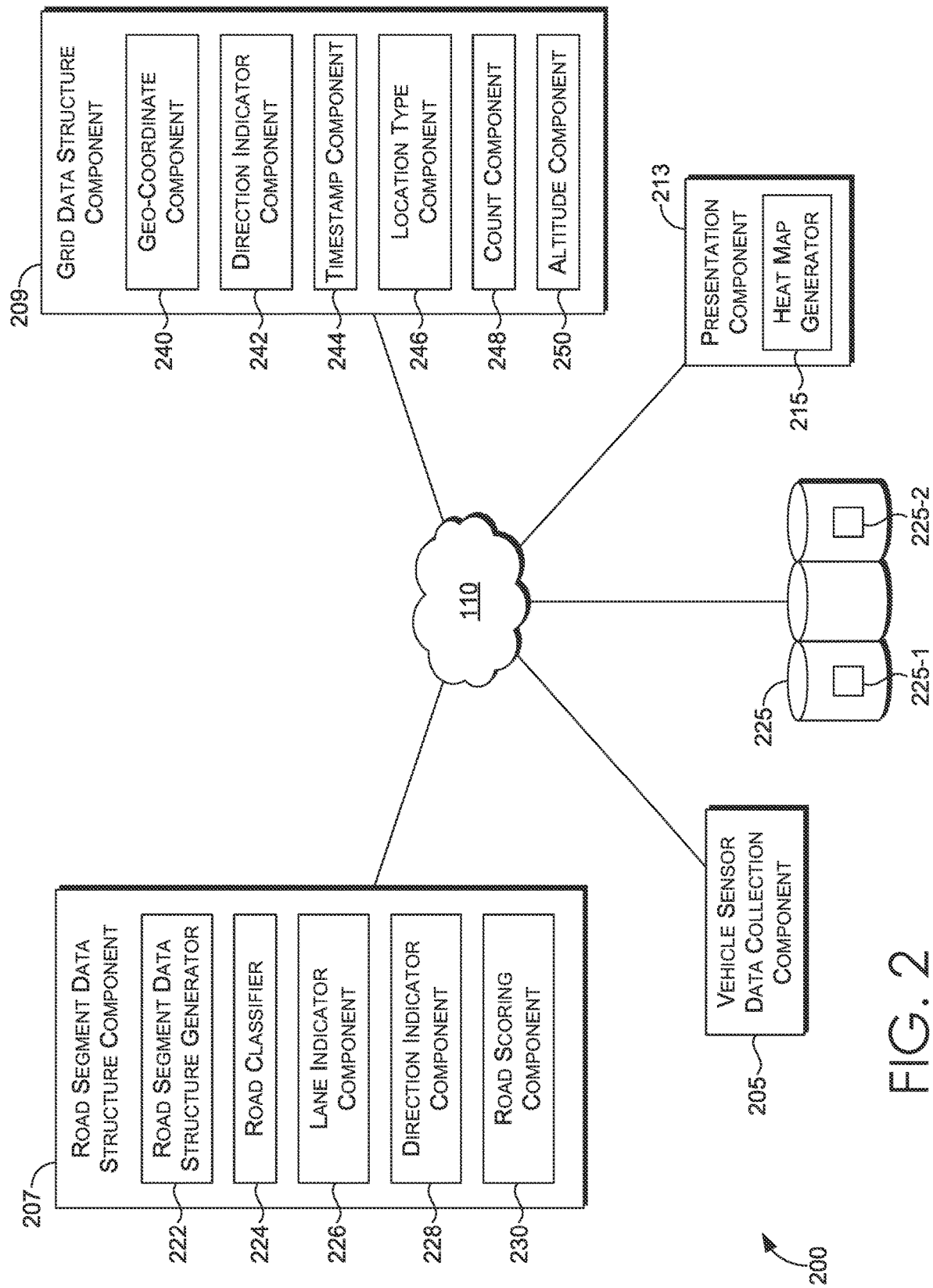
FIG. 2 is a block diagram illustrating aspects of an example computing system architecture, according to some embodiments.

Turning now to FIG. 2, with FIG. 1, a block diagram is provided showing aspects of an example computing system architecture suitable for implementing some embodiments of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network(s) 110, which is described in connection to FIG. 1, and which communicatively couples components of system 200 including the vehicle sensor data collection component 205, the road segment data structure component 207, the grid data structure component 209, the route generator 211, and the presentation component 213. These components may be embodied as a set of compiled computer instructions or functions, program modules, computer software services, or an arrangement of processes carried out on one or more computer systems, such as the computing device(s) 105 of FIG. 1, the user device(s) 150 of FIG. 1, and/or the computing device 1800 described in connection to FIG. 18, for example.

In one embodiment, the functions performed by components of system 200 are associated with one or more personal assistant applications, services, or routines. In particular, such applications, services, or routines may operate on one or more user devices (such as user device(s) 150), servers (such as 105), may be distributed across one or more user devices and servers, or be implemented in the cloud. Moreover, in some embodiments, these components of system 200 may be distributed across a network, including one or more servers (such as 105) and client devices (such as user device(s) 150), in the cloud, or may reside on a user device, such as user device(s) 150. Moreover, these components, functions performed by these components, or services carried out by these components may be implemented at appropriate abstraction layer(s) such as the operating system layer, application layer, hardware layer of the computing system(s).

Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

The vehicle sensor data collection component 205 is generally responsible for receiving (e.g., from the vehicles 120 of FIG. 1) sensor data, formatting or structuring the sensor data (e.g., via normalization, ETL, as described above with respect to FIG. 1), and tagging the sensor data additional metadata (e.g., timestamps) associated with the sensor data. For example, the vehicle sensor data collection component 205 can receive near real-time time series data ever N seconds from the vehicles 120. The vehicle sensor data collection component 205 may then map each set of sensor data to its property/attribute (or signal name, such as gyroscope) or associated container or other data structures (e.g., a queue along with a sensor reading value (e.g., gyroscope value: y M/s$^2$) and timestamp. In some embodiments, the timestamp represents the data and time the respective set of data was generated at a particular vehicle (e.g., as opposed to received). In some embodiments, the metadata includes geo-coordinates, such as a Global Positioning System (GPS) latitude and longitude received at every X time interval, which is based on a GPS sensor coupled to the vehicles 120 and that detects or samples its location every Y time interval via the one or more satellites 160.

In particular embodiments, the vehicle sensor data collection component 205 detects geolocation data (e.g., GPS data) by identifying the number of satellites 160 in view and the relative positions of those satellites (e.g., using global positioning systems (GPS)) 160. The satellites 160 may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, geolocation data can be determined by triangulating each vehicle's 120 (or the sensor 120-1) position in connection with a variety of other systems, including cellular towers, Wi-Fi access points, and/or the like. Similarly, the sensor 120-1 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The road segment data structure component 207 is generally responsible for generating (or deriving) one or more road segment data structures 225-1 and tagging/populating each road segment data structures 225-1 with various attribute values therein. In some embodiments, the road segment data structure component 207 represents the road segment data structure component 107 of FIG. 1. The road segment data structure 207 includes the road segment data structure generator 222, the road classifier 224, the lane indicator component 226, the direction indicator component 228, and the road scoring component 230.

The road segment data structure generator 222 is generally responsible for generating one or more road segment data structures 225-1. For example, at a mapping application build time, the road segment data structure generator 222 may generate several overlapping quadrilaterals per lane, where each quadrilateral represents a section of a road, and where each corner is defined by various vertices and geo-coordinates. The construction of the road segment data structure is described in more detail below.

The road classifier 224 is generally responsible for classifying or otherwise determining whether one or more roads (and/or road segment data structures) are "off-road" roads/segments (e.g., an unmarked dirt path) or "on-road"/non-off-road roads (e.g., a named paved street)/segments. An "off-road" road may be any suitable section of a geographical area that is not a paved or marked street that can be used to get from one location to another. In some instances, off-road roads are unmarked (e.g., there is no street name) or are not discernable as a road (e.g., the road is not a paved street or dirt road, but has various geographic obstacles). For example, in some embodiments, an off-road road may not appear as a road and can include boulders, shrubs, or other obstacles, and the like. In these embodiments, while the road itself is not identifiable as a road per se, the geographical area is suitable or otherwise traversable enough for a vehicle to use to travel between locations. A "non-off-road road" or "on-road" road is a paved street, a cement street, a dirt road, or other street that is clearly identifiable as a street (e.g., has a street name or has boundaries that indicate a road). But in some embodiments, any dirt road is an off-road street regardless of whether or not it is marked.

As described above, in some embodiments, each road segment data structure is classified. Likewise, in some embodiments, each road segment data structure has a lane indicator, direction indicator, or road score according to the functionality performed by the lane indicator component 226, the direction indicator component 228, and the road scoring component 230. Accordingly, each portion of the road is classified or otherwise has a score associated with it. In some embodiments, such sub-classification is used or aggregated to generate an overall classification or other score for the entire road based on weighting or otherwise aggregating sub-scores or classifications. For example, if a single road is broken down to 4 street segment data structures, and 3 of the 4 data structures classify the road as an "off-road" road, then the road classifier 224 may classify the entire road being an "off-road" road based on the count or quantity (or percentage) of sub off-road classifications exceeding a threshold.

In some embodiments, the road classifier 224 classifies a road (or individual road segment data structure) based analyzing sensor data received by the vehicle sensor data collection component 205. For example, if an accelerometer reading, gyroscope reading, and/or air suspension reading, exceeds a threshold on a threshold quantity of vehicles, this may indicate that the corresponding road section is bumpy or otherwise rough due to the various movements the vehicles are experiencing, which ultimately indicates that the road section is an off-road road. In some embodiments, a model or classifier, such as a neural network or other machine learning model, takes these or other sensor readings as input and combines them as vector values in order to generate a final score (e.g., a confidence interval likelihood or vector distance) indicative of whether the road is an off-road road or non-off-road road. In these embodiments, the road classifier 224 can train the model over many epochs in order to learn weights and minimize loss (according to any suitable loss function) associated with various node activations or inhibitions, which correspond the model learning which sensor reading values correspond to which classifications (e.g., via labeling historical sensor values with particular classifications). In some embodiments, the road classifier 224 uses the road scoring component 230, in order to make its classifications, as described in more detail below.

In some embodiments, the road classifier 224 alternatively or additionally classifies a road (or individual road segment data structure) based analyzing third party data. Third party data can include data derived from other computer applications, such as mapping applications, that indicate whether roads are interstates, highways (indicative of non-off-road roads), or otherwise are off-road or non-off-road roads. In some of these embodiments, the road classifier 224 may be an extension or other routine that programmatically calls an Application Programming Interface (API) of the third part application to obtain this data. In some of these embodiments, the road classifier 224 obtains and analyzes crowdsourced data from many users or drivers to indicate the classification.

The lane indicator component 226 is generally responsible for predicting or estimating the quantity of lanes one or more roads (or individual road segment data structure) has. The direction indicator component 228 is generally responsible for predicting a direction or heading of traffic flow for one or more roads (or individual road segment data structures). In some embodiments, the functionality performed by the lane indicator component 226 and the direction indicator 228 is based analyzing sensor data received by the vehicle sensor data collection component 205. For example, a first set of vehicles may have a GPS sensor that transmits its location every N time interval as the first set of vehicles travel north on a first lane. Likewise, a second set of vehicles may have a GPS sensor that transmits its location every N time interval as the second set of vehicles travel south on the first lane. Such information is indicative of both the quantity of lanes and direction. Because GPS data is received every particular interval and every such interval indicates vehicle directional displacement between received coordinates, the lane indicator component 226 receives an indication of a lane that is present. In the example given above, because a threshold quantity of cars have been displaced going from North to South and South to North, an inference can be made that there are 2 lanes in this road. In order to make a final score of lanes, the lane indicator component 226 may remove any outlier data, such as times when a vehicle pulled over, and the like in order to get a clear picture of the lane. In a similar manner, because GPS data is received every particular interval and every such interval indicates direction displacement between received coordinates, the direction indicator component 228 receives an indication that the flow of traffic is both North and South. In the example given above, because a threshold quantity of cars have been displaced going from North to South and South to North, the direction indicator component 228 infers or estimates that the direction of flow is North and South.

In some embodiments, the lane indicator component 226 and/or the direction indicator component 228 performs its functionality based on obtaining data via third party entities, such as via an API of a mapping application, as described above. Also, as described above, in some embodiments, the lane indicator component 226 and/or the direction indicator component 228 represents or uses a machine learning model to learn lane quantity and heading.

The road scoring component 230 is generally responsible for scoring different roads (or road segment data structures of a single road) for particular metrics based on analyzing the sensor data collected via the vehicle sensor data collection component 205 and/or via a third party entity. Examples of such metrics include a vehicle efficiency score for the first section, a vehicle wear and tear score for the first section, a road flow score for the first section, a road comfort score for the first section, a road safety score for the first section, a suspension mode score for the first section, and the like. Each of these metrics are described in more detail below.

The grid data structure component 209 is generally responsible for deriving different attribute values of one or more grid data structures 225-2, which represents different sections of a geographical area, such as earth. In some embodiments, the grid data structure component 209 represents the grid structure component 107 of FIG. 1. The grid data structure component 209 includes the geo-coordinate component 240, the direction indicator component 242, the timestamp component 244, the location type component 246, the count component 248, and the altitude component 250.

The geo-coordinate component 240 is generally responsible for tagging or otherwise populating one or more grid data structures with one or more geo-coordinates and/or generating an identifier to identify the corresponding grid data structure. For example, in some embodiments, the geo-coordinates component 240 extracts the latitude and longitude of a center point of each grid data structure or corresponding section of a geographical area. Such extraction can be performed via any suitable method, such as calling a third party's API (e.g., GOOGLE plus codes), or via sensor data received from the vehicle sensor data collection component 205 of FIG. 2.

The direction indicator component 242 indicates the direction of traffic flow for all street segments data structures included in or a part of one or more grid data structures. For example, a geofence that includes a neighborhood may include 12 streets and the direction of traffic flow may be indicated for each of the 12 streets. In some embodiments, the direction indicator component 242 programmatically calls or includes the same functionality as described with respect to the direction indicator component 228 of the road segment data structure component 207.

The timestamp component 244 is generally responsible for generating a timestamp (e.g., a date and clock time) indicating when attributes (e.g., sensor data) were first generated (e.g., sampled or detected by the sensors 120-1 of the vehicles 120 of FIG. 1) and last generated in areas represented by one or more corresponding grid data structures. The location type component 246 is generally responsible for indicating whether a particular data point (e.g., a GPS latitude and longitude or point where other sensor data was sampled) is a "synthetic" or "normal" data point, which is described in more detail below.

The count component 248 is generally responsible for counting and storing a quantity of times data was added to one or more grid data structures. In some embodiments, the count component 248 is generally responsible for indicating vehicle identifiers for vehicles that have traversed respective sections (corresponding to one or more grid data structures) and that are responsible for respective sets of attribute values (e.g., by including sensors that detect certain sensor readings).

The altitude component 250 is generally responsible for populating one or more grid data structures with altitude values (e.g., in meters), which can be derived from third party sources (e.g., via a programmatic API call) or sensor data received from the vehicles 120 and collected via the vehicle sensor data collection component 205. It is understood that the road segment data structure component 207 can include the components within the grid data structure component 209 and the grid data structure component 209 can include the components of the road segment data structure component 207.

The presentation component 213 is generally responsible for causing presentation of content in response to one or more user requests (e.g., to compute a route) based at least in part on the functionality performed by the road segment data structure component 207 and/or the grid data structure component 209. Presentation component 213 may comprise one or more applications or services on a user device, across multiple user devices, or in the cloud. For example, in one embodiment, presentation component 213 manages the presentation of content to a user across multiple user devices associated with that user. Based on content logic, device features, associated logical hubs, inferred logical location of the user, and/or other user data, presentation component 213 may determine on which user device(s) content is presented, as well as the context of the presentation, such as how (or in what format and how much content, which can be dependent on the user device or context) it is presented and/or when it is presented. In particular, in some embodiments, presentation component 213 applies content logic to device features, associated logical hubs, inferred logical locations, or sensed user data to determine aspects of content presentation.

In some embodiments, presentation component 213 generates user interface features (or causes generation of such features) associated with electronic maps or applications, such as described with respect to FIG. 3 and FIGS. 9-11. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 213 determines when and how to present the content. In such embodiments, the content, including content logic, may be understood as a recommendation to the presentation component 213 (and/or personal assistant service or application) for when and how to present the notification, which may be overridden by the personal assistant app or presentation component 213.

In some embodiments, the presentation component 213 takes, as input, functionality performed by the vehicle sensor data collection component 205, the road segment data structure component 207, the grid data structure component 209 and/or any other functionality (e.g., a route generator), in order to produce corresponding user interface features. For example, in some embodiments the presentation component 213 decodes a set of data produced by the road segment data structure component 207 and/or the grid data structure component 209 and mathematically expresses a "road comfort" score indicator (e.g., "this road is not comfortable") and renders the actual graphical user interface indicator using the mathematical expression as the function to set the intensity of a field of RGB colors or otherwise actually structure the graphical user interface element according to the mathematical expression.

The heat map generator 215 is generally responsible for visually indicating (e.g., via different colors) a quantity of times or amount of times a group of vehicles (e.g., the vehicles 120) have traversed one or more roads or have otherwise performed an event, such as a charge event, as described in more detail below. Such heat maps can be useful for vehicle manufacturers or other entity, as well as driving users to be able to tell how safe or driven a road actually is and what types of vehicles traverse a given road. The heat map generator 215 is described in more detail below.

Example system 200 also includes storage 225. Storage 225 generally stores information including data, computer instructions (for example, software program instructions, routines, or services), data structures (i.e., road segment data structures 225-1 and grid data structures 225-2), and/or models used in embodiments of the technologies described herein. By way of example and not limitation, data included in storage 225, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, data or information (for example, the requested content) may be provided in user signals. A user signal can be a feed of various data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

In some embodiments, the system 200 includes other components not illustrated, such as a route generator. In these embodiments, the system uses the information determined via the vehicle sensor data collection component 205, the road segment data structure component 207, and the grid data structure component 209 in order generate a most efficient route (e.g., in terms of time or other factors) or set of route candidates. This component can take one or more attributes as input, such as user-provided make an model of car, year of model, mileage, custom made attributes (such as suspension indicators), and/or whether the user is okay driving off-road in order to generate one or more routes. For example, if a user inputs a vehicle that is an off-road type of vehicle and the user is okay going off-road, the route generator may recommend an off-road route to drive to a location.

Figure 3:
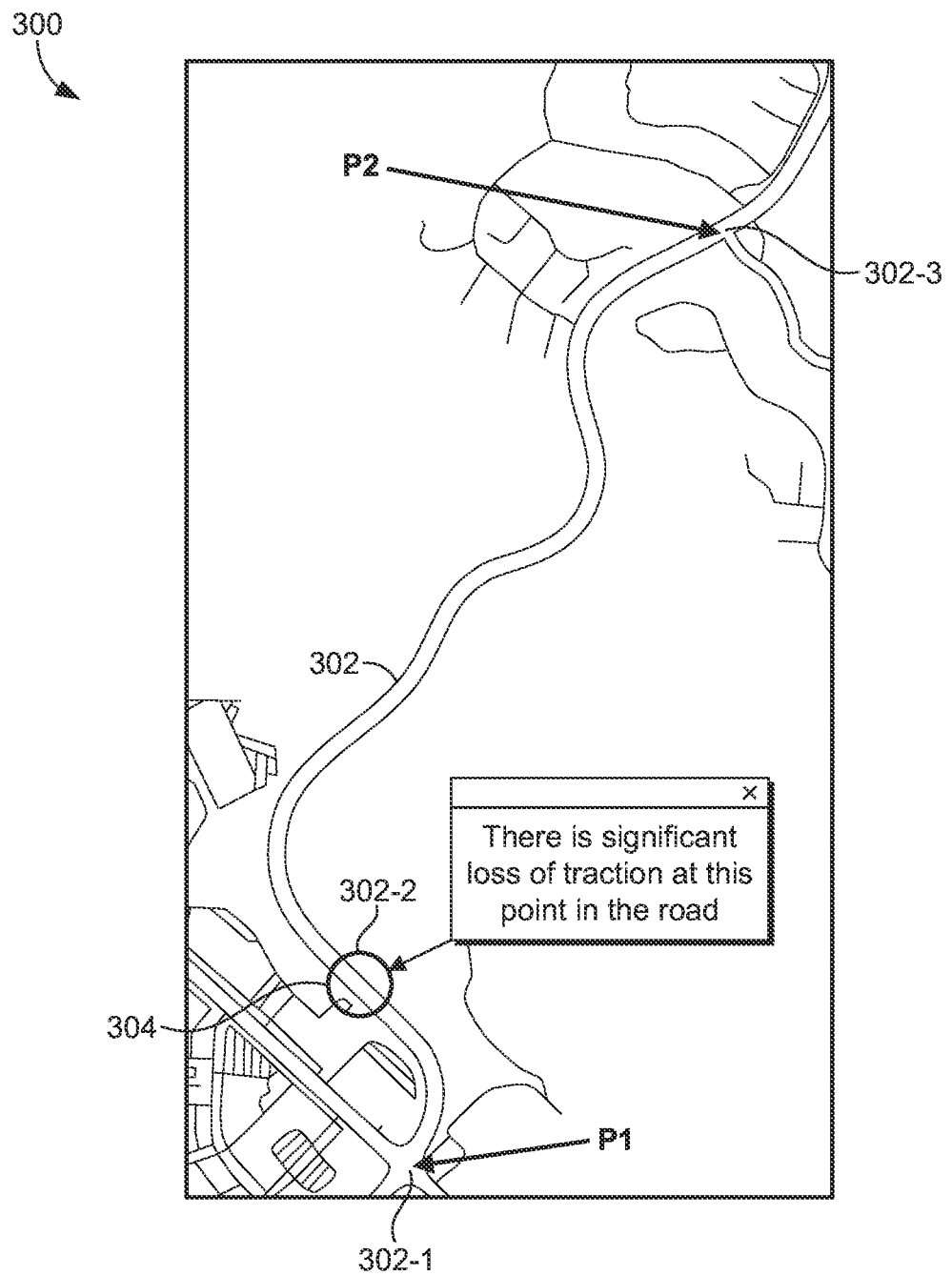
FIG. 3 is a screenshot of an example electronic map, according to some embodiments.

Turning now to FIG. 3, a screenshot 300 of an example electronic map (e.g., produced by the presentation component 213 of FIG. 2), according to some embodiments. FIG. 3 illustrates that for the road 302—Silver Creek Valley Road—at the portion of the road 302-2, there is a significant loss of traction at that point, as indicated by the popup window 310. In some embodiments, sensor data is captured or detected starting at point 302-1 and ends at point 302-3 and used to formulate the popup window 310.

In some embodiments, FIG. 3 additionally or alternatively (e.g., without the popup window 310) represents an example data request. The API may accept GPS points 302-1 and 302-3, indicating the stretch of roadway between these points directionally. In other words 302-1→302-3 is the northeast (and uphill) stretch of road, whereas 302-3→302-1 is the southwest (and downhill) stretch of road.

In some embodiments, the road 302 represents an off-road path. Many vehicles have off-road capabilities. Off-road paths vary in many ways from their on-road counterparts. However, as described above, existing technologies are limited in including the road 302 in their routing or other functionality, such as the popup window 310. A driver is often faced with a simple question in many off-road situations, such as whether they can drive on the road legally or safely. Drivers may face hazards that lead to a "stuck" vehicle (e.g., a sidewall tear). Accordingly, various embodiments of the presents disclosure aggregate off-road data (e.g., via the road segment data structure component 207 and the grid data structure component 209) to provide an accurate sense of road difficulty. For example, attribute values, such as vehicle speed, traction (e.g., via a traction control system sensor), accelerometer data, and the like can all be used to derive a road difficulty score (e.g., one of the scores scored by the road scoring component 230).

Any suitable calculations or visualizations can be used in additional or alternative to traction detection as indicated in the popup window 310, such as frequency of off-road routes (via a heat map), as well as precise tracks, flat tire events, or significant vehicle movement (e.g., heave, yaw, and roll). In some embodiments, precise tracks are estimated based on the positions of multiple vehicles (e.g., 120) or GPS sensors thereon over an X quantity of times. For example, each time a GPS location is transmitted, its geo-coordinates can be sampled as a data point or node. Such action can be done for multiple vehicles. Then, the average or other aggregated position of each node of each vehicle can then be averaged or otherwise aggregated. Then each aggregated node can be connected via edges in order to formulate the specific tracks or road. In some embodiments, vehicle movement is calculated via any suitable movement sensors, such as accelerometer, gyroscope, a yaw rate sensor, or the like. For example, a yaw rate sensor (or rotational speed sensor) measures a vehicle's angular velocity about its vertical axis in degrees or radians per second in order to determine the orientation of the vehicle as it hard-corners or threatens to roll-over. A yaw rate sensor is a key component in a vehicle's stability control or electronic stability control system. Yaw can be defined as the movement of an object turning on its vertical axis. The yaw rate sensor determines how far off-axis a car is "tilting" in a turn using gyroscopes to monitor the slip angle, the angle between the vehicle's heading and actual movement direction. This information is then fed into the vehicle's computer to evaluate the wheel speed, steering angle and accelerator position, and, if the system senses too much yaw over a threshold, this information is recorded, in computer storage, indicating the specific condition at the precise geo-coordinates or road segments. By comparing the vehicle's actual yaw rate to the target yaw rate, the on-board computer can identify to what degree the vehicle may be under- or over-steering.

In some embodiments, flat tires are detected via a sharp drop (over a threshold) in pounds per square inch (PSI), as detected via a tire pressure sensor, which can be located in the pressurized packet in a wheel and tire. Such tire pressure sensors can constantly measure the air pressure inside a tire. In some embodiments, this sensor transmits that information via low-frequency radio to the vehicle's onboard computer and/or the computing device(s) 105 or the road scoring component 230.

Figure 4:
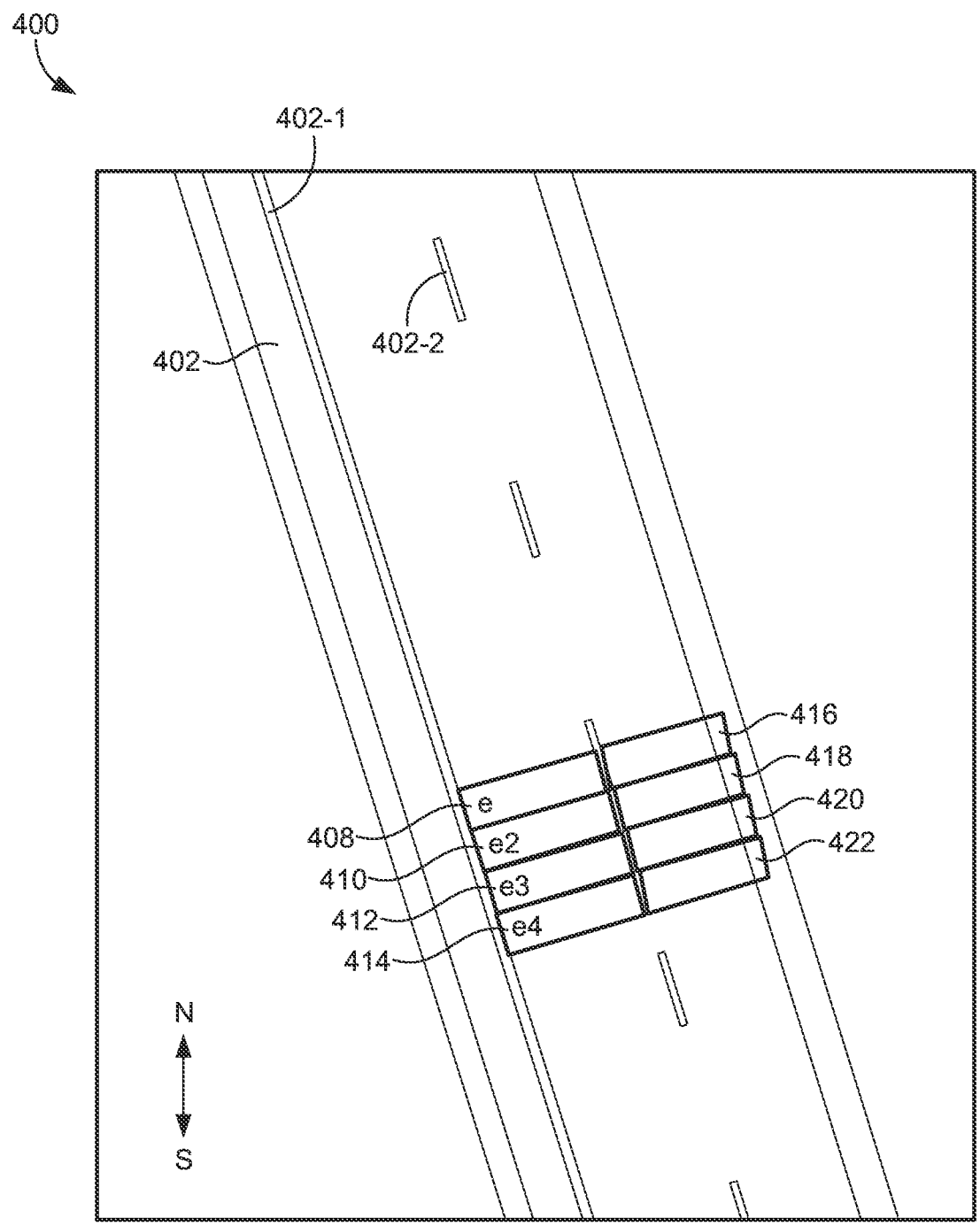
FIG. 4 is a schematic diagram illustrating a geographical area that includes various road segment data structures, according to some embodiments.

FIG. 4 is a schematic diagram illustrating a geographical area 400 that includes various road segment data structures, according to some embodiments. In some embodiments, the geographical area represents the area 302-2 of FIG. 3. In some embodiments, each of the road segment data structures in FIG. 4 are generated or populated with the road segment data structure component 207 of FIG. 2. As illustrated in FIG. 4, each road segment data structure, such as 408, represents a small portion of a road (e.g., road 402), each road segment represents an approximately 1-meter high quadrilateral portion of a road, that is defined by a width of a single lane (e.g., the length between the side of the road 402-1 and the lane divider 403-2), and is addressable by its GPS coordinate vertices, as described in more detail blow.

As described herein, in some embodiments, each road segment data structure has an indication of direction of traffic flow. For example, road segment data structure 408 may include an identifier "South," indicating that the traffic flow is south, which is also the case for road segment data structures 410, 412, and 414. Likewise, road segment data structure 416, may include an identifier "North," indicating that the traffic flow is north, which is also the case for road segment data structures 416, 418, 420 and 422. As described herein, in some embodiments, each road segment data structure also has a lane designation. For example, road segment data structure 408 may include a "lane: 1" attribute-value pair, which is also the case for road segment data structures 410, 412, and 414, since they are to the left of the lane divider indicator 402-2. Similarly, road segment data structure 416 may include a "lane: 2" attribute-value pair, which is also the case for road segment data structures 416, 418, 420 and 422, since they are to the right of the lane divider indicator 402-2.

In various embodiments, each road segment data structure holds the necessary data to provide any score, as calculated by the road scoring component 230 of FIG. 2. For example, and as described in more detail below, this might include hundreds of Wh/mile data points from multiple vehicles over time. The APIs can return efficiency data between any two GPS points. If there is enough data aggregated, in some embodiments, an average efficiency value is computed and returned.

As illustrated in FIG. 4, road segment data structures 408, 410, 412, and 414 are all stacked on top of one another, and road segment data structures 416, 418, 420, and 422 are also stacked on top of each other in order to account for the entire road 402 (even though FIG. 4 illustrates only a portion of road segment data structures covering the road 402). FIG. 4 also illustrates that pairs of road segment data structures are also adjacent to and parallel to each other. For example, road segment data structure 408 is adjacent to and parallel to road segment data structure 416, and share a border of the lane divider 402-2. In some embodiments, each of the road segment data structures are caused to be presented at the user device(s) 150. In other embodiments, the road segment data structures are not caused to be presented or otherwise viewable by users, but instead represent logical structures used by computers only.

Figure 5:
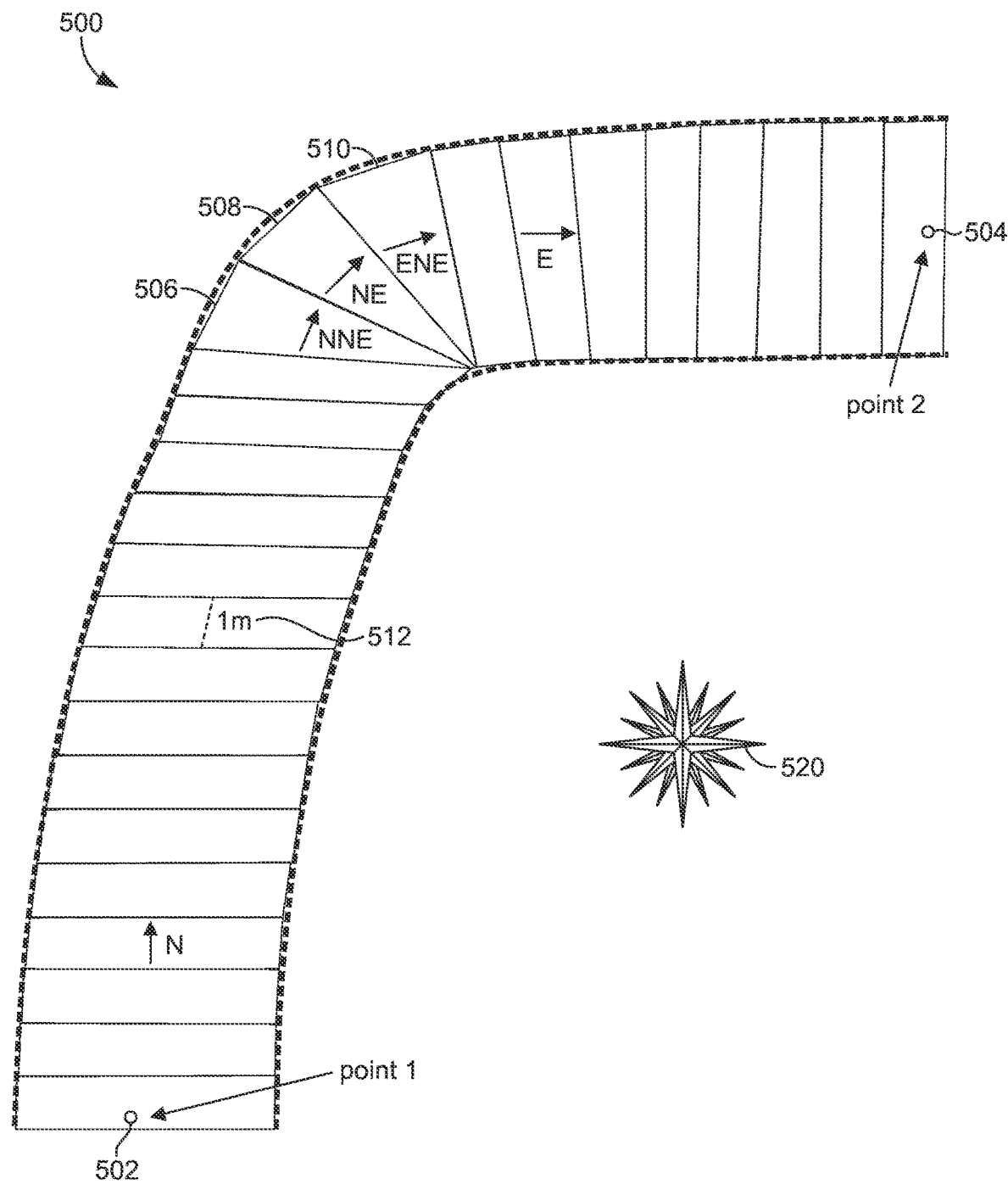
FIG. 5 is a schematic diagram of several stacked road segment data structures representing a road, according to some embodiments.

FIG. 5 is a schematic diagram of several stacked road segment data structures representing a road 500, according to some embodiments. Specifically, FIG. 5 specifically illustrates a series of quadrilateral segments as retuned from an API from point 502 to point 504 (e.g., based on a user request to obtain data regarding this stretch of road).

As illustrated in FIG. 5, each road segment data structure is a quadrilateral (has four sides) or at least a polygon (e.g., 506, 508, and 510). Polygons have at least three sides and angles. Each quadrilateral represents an approximately 1 meter high portion of a road, as measured at the horizontal center, as indicated by 512. The designation "high" in this context refers to a Y-axis plane or longitudinal plane, as indicated by 512.

FIG. 5 additionally illustrates that specific direction or heading indicators (illustrating the flow of traffic) that each road segment data structures can contain, such as shown in 506, 508, and 510, which indicate a North, Northeast designation (506), a Northeast designation (508), and an East, Northeast designation 510, as defined in the compass 520. Direction is an enumeration coding of the 16-point compass rose 520. As described in more detail below, by examining the surrounding synthetic or natural points, a direction is determined. The table 1 below indicates the different direction indicators and corresponding degrees:

TABLE 1

| Cardinal Direction | Degree (>=) | Degree (<) |
| --- | --- | --- |
| N | 348.75 | 11.25 |
| NNE | 11.25 | 33.75 |
| NE | 33.75 | 56.25 |
| ENE | 56.25 | 78.75 |
| E | 78.75 | 101.25 |
| ESE | 101.25 | 123.75 |
| SE | 123.75 | 146.25 |
| SSE | 146.25 | 168.75 |
| S | 168.75 | 191.25 |
| SSW | 191.25 | 213.75 |
| SW | 213.75 | 236.25 |
| WSW | 236.25 | 258.75 |
| W | 258.75 | 281.75 |
| WNW | 281.25 | 303.75 |
| NW | 303.75 | 326.25 |
| NNW | 326.25 | 348.75 |

In some embodiments, each road segment data structure is pinned to an edge of a scoring rectangle or other grid data structure (e.g., on the bottom and tope), as described in more detail below. In some embodiments, FIG. 5 illustrates that the width of a road segment data structure stretches across an entire width of a road, as opposed to a width of a single lane of a road, as indicated in FIG. 4.

Figure 6:
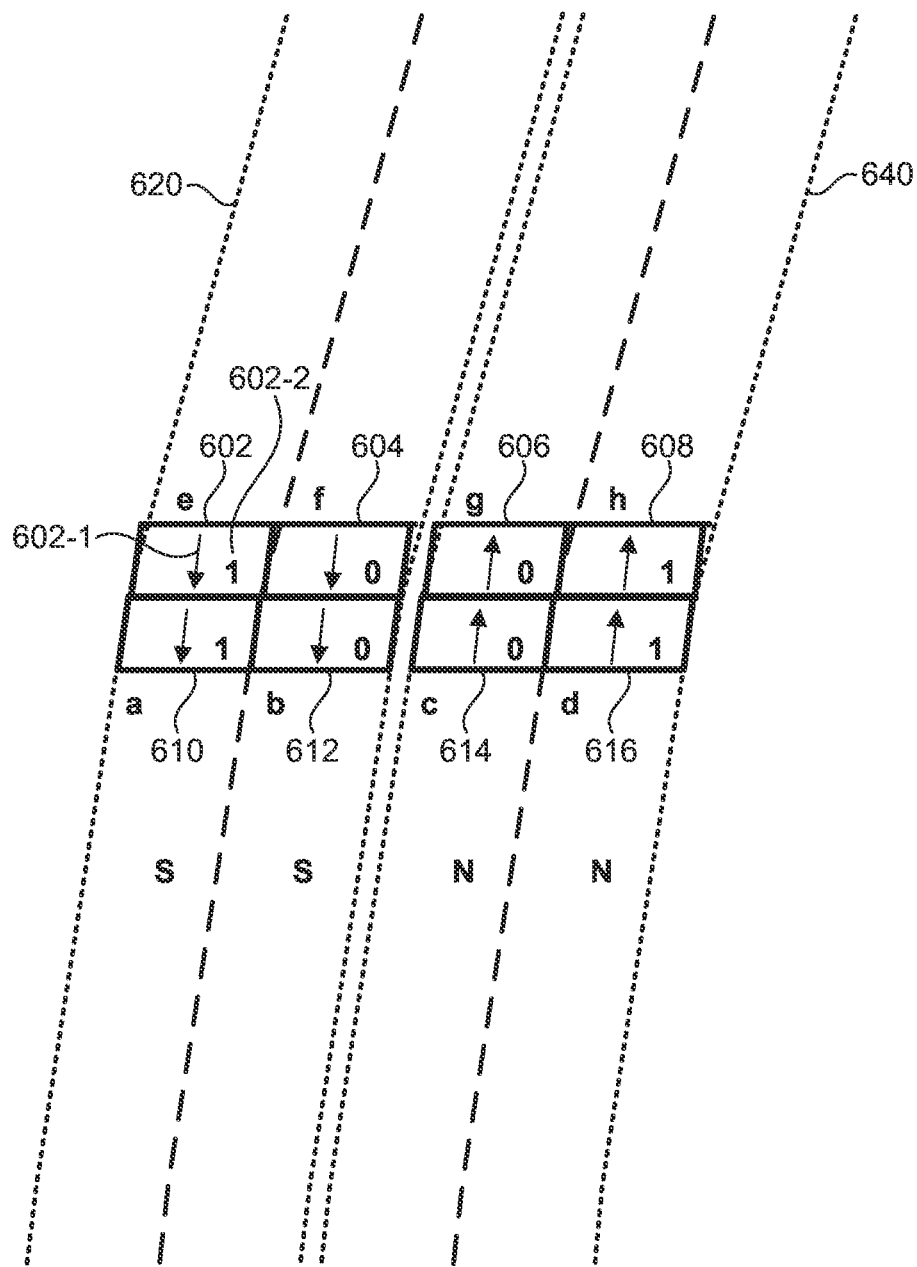
FIG. 6 is a schematic diagram of multiple road segment data structures representing multiple lanes of a highway, according to some embodiments.

FIG. 6 is a schematic diagram of multiple road segment data structures representing multiple lanes of a highway, according to some embodiments. FIG. 6 specifically illustrates 8 road segment data structures. Road indicator 620 (a logical structure representing a road) includes road segment data structures 602, 604, 610, and 612. Likewise, road indicator 640 includes road segment data structures 606, 608, 614, and 618. Each road segment data structure has a direction indicator and a lane indicator. For example, road segment data structure 602 includes a down arrow 602-1 (or an "S" value) indicating that the direction of traffic flow is South. Further, road segment data structure 602 includes a "1" integer value, indicating that this is lane number 1 of the road corresponding to the indicator 620. In some embodiments, street segment data structures include shoulder portions of a road or shoulder portions have their own discrete data structures.

Figure 7:
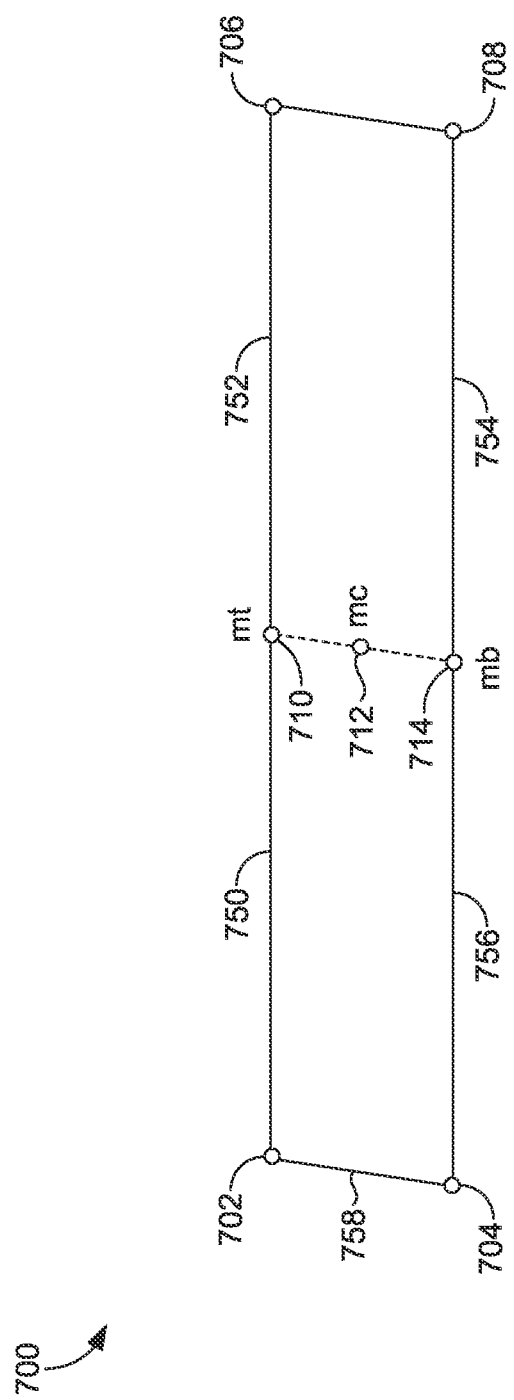
FIG. 7 is a schematic diagram illustrating a single road segment data structure, according to some embodiments.

FIG. 7 is a schematic diagram illustrating a single road segment data structure 700, according to some embodiments. In some embodiments, the road segment data structure 700 is generated by the road segment data structure generator 222 of FIG. 2. In some embodiments, the road segment data structure 700 represents any road segment data structure described herein, such as road segment data structure 408, road segment data structure 506 of FIG. 5, or road segment data structure 602 of FIG. 6.

As illustrated in FIG. 7, the road segment data structure 700 is a quadrilateral, with four vertices that define the boundaries—702, 704, 706, and 708, a midpoint vertex 710 between the edges 750 and 752, a midpoint vertex 714 between the edges 756 and 754, as well as a center point vertex 712. The midpoint vertices 710 and 714, as well as the center point vertex 712 represent the middle of the respective lane of a road (or middle of the road itself where the street segment stretches across an entire width of the road).

In some embodiments, when street segment data structure is stored, one or more attribute values are stored, such as street segment data structure ID (e.g., 700), the latitude and longitude coordinates of each vertex, whether the edges are "true" or "manufactured," the direction or heading, the lane identifier, as well as the road identifier, as indicated in the table below. In some embodiments, whether an edge is "true" or "manufactured" is dependent on whether embodiments receive direct information about the boundaries of a road (edge is "true") or not (edge is "manufactured") or whether embodiments receive an indication of whether the road is off-road (edge is "manufactured") or on-road (edge is "true"). For example, particular embodiments may programmatically call, via an API, a mapping application that returns the true values indicating an electronic map with the borders of a road. Accordingly, various embodiments can logically trace or otherwise indicate the borders in the electronic map with the edges of the road segment data structures. Table 2 below illustrates that information that can be stored to a road segment data structure:

TABLE 2

| Property | Description |
| --- | --- |
| segment_id | GUID |
| v1 | Vertex 1: latitude, longitude, altitude |
| v2 | Vertex 2: latitude, longitude, altitude |
| v3 | Vertex 3: latitude, longitude, altitude |
| v4 | Vertex 4: latitude, longitude, altitude |
| mc | Center point: latitude, longitude, altitude |
| true_edges | Boolean, if v1 . . . v4 are true or manufactured |
| direction | Enum, 16-point compass rose e.g., NNW |
| lane | Integer, 0 to n (left to right) |
| road_id | GUID road identifier |
| adjacent top | segment_id of adjacent segment sharing v1, v2 |
| adjacent_btm | segment_id of adjacent segment sharing v4, v3 |
| adjacent_left | If multi-lane, segment to left or null |
| adjacent_right | If multi-lane, segment to right or null |

TABLE 2-continued

| Property | Description |
| --- | --- |
| gradient | gradient aligned to road (mb→mt) |
| gradient_lateral | (v1, v4) → (v2, v3) gradient |

As illustrated in table 2, each road segment data structure has a unique GUID. As also illustrated in table 2, each road segment data structure stores information about its adjacent road segment data structures—top, bottom, left, and right—if present. For example, referring back to FIG. 4, road segment data structure 408 may store information that its "bottom" neighbor is road segment data structure 410 because it's top edge is shared or connected to the bottom edge of the road segment data structure 408, and the road segment data structure 408 may store information that its "right" neighbor is road segment data structure 416 because its right edge is connected or shared with the left edge of road segment data structure 416.

In some embodiments, a road segment data structure is defined by its center point, which is its latitude and longitude. In some embodiments, the enter point is positioned at the center of the lane and is equidistant from the top and bottom. As described above, in some embodiments, vertices are either "true" or manufactured. This is noted by the true_edges Boolean value. If the road edges are known, they are recorded as "true." If they are not known (i.e., they are "manufactured"), they are approximated by the road's width. In some embodiments, if edges are manufactured, the altitudes will match the center point. In some embodiments, the "lane" is an integer from 0 to n, depending on the number of lanes. In some embodiments, lanes are number from left to right in the direction of traffic (mb→mt). In some embodiments, a 1-lane road will record 0 for the lane.

In some embodiments, each road segment data structure, such as road segment data structures 700, stores additional (or alternative) attributes and values associated with any value produced by the road scoring component 230 of FIG. 2. For example, such attributes and values can be or include a vehicle efficiency score, a vehicle wear and tear score, a road flow score, a road comfort score, and a road safety score. By collecting a series of data points in each road segment data structure, "road DNA" is extracted, which describes the characteristics of a particular section of a road. This indicates the uniqueness and similarity to other sections of a road.

A vehicle efficiency score indicates score indicates how efficient a vehicle is traversing a road or particular section of a road corresponding to a road segment data structure. In some embodiments, a vehicle efficiency score is generated via sensors determining the Watt-hours per mile (Wh/mile) an electronic vehicle travels, which indicates how much energy a vehicle consumes over a mile. The higher the Wh/mile number, the lower the score or the less efficient the road is, whereas the lower the Wh/mile number, the higher the score is or more efficient the road is. Vehicles typically consume more energy the steeper or more sloped a road is, when the road is not paved, when the road contains obstacles (e.g., laid down trees), or the like. Accordingly, such vehicle efficiency score can be indicative of one or more of these features being present. A Watt-hour is the voltage (V) that the battery provides multiplied by how much current (Amps) the battery can provide for some amount of time (generally in hours). Voltage*Amps*hours=Wh. Since voltage is essentially fixed for a battery type due to its internal chemistry (alkaline, lithium, lead acid, etc.), often only the Amps*hour measurement is indicated in a data structure, such as a hash table, expressed in Ah or mAh (1000 mAh=1 Ah). To get Wh, these sensors can multiply the Ah by the nominal voltage. Wh/mile need not be used, but other efficiency indicators, such as miles per kilowatt-hour, or miles per gallon and the like.

An air suspension mode score indicates how high a vehicle is relative to the ground or any other fix point. Vehicle air suspension is a method of shock absorption, typically by means of rubber bellows (or airbags) filled with compressed air to create a cushioning effect. Air is distributed through hoses to the bellows on each strut to adjust pressure, allowing the vehicle to raise and lower either through manual controls or automatically. There are various air suspension sensors coupled with programming that can adjust suspension or vehicle height based on GPS location, speed, and/or other driving conditions. In other words, sensors can adjust a suspension system that adapts to the vehicle's physical location (GPS geofencing) and its speed or other factors via software. Along with the ability to manually adjust the height of the car through the vehicle's control panel or through various drive modes. Drive modes will automatically select ride higher right height for certain applications and lower ride heights for other applications. Drivers can expect the car to save the GPS location of the vehicle for each adjustment. Then particular embodiments can automatically adjust the height of the car when it encounters a saved data point, such as a steep driveway, a carwash, or bumpy dirt road, for example. Each time the height of the car adjusts, the height value can be stored and transmitted to indicate the air suspension score. Such score may indicate or be used for other larger scores, such as road comfort score, road efficiency score, road safety score, and the like.

A vehicle wear and tear score indicates a quantitative/cardinal score (e.g., "high," "medium," or "low") that indicates the wear or tear a vehicle will experience when travelling down a particular road or road section corresponding to an individual road segment data structure. In some embodiments, a vehicle wear and tear score is generated via accelerometer, gyroscope, pitch sensors, yaw sensors, roll sensors, and/or any other suitable movement sensor where the reading exceeds one or more thresholds. The higher the movement value, the lower the wear and tear score or the more wear and tear a vehicle experiences. In some embodiments, the vehicle wear and tear score is additionally or alternatively calculated via the amount of braking a vehicle experiences, which can be calculated via one or more movement sensors (e.g., an accelerometer) or via a Brake Pedal Sensor (BPS), which is typically used to trigger a brake light and senses the position of a brake pedal. However, in some embodiments, the output signal can be changed to additionally log instances of when the brake was depressed over a threshold.

A road flow score (also referred to as a "stop-and-go" score) indicates how often a vehicle stops while traversing a road or certain section of the road corresponding to one or more street segment data structures. The higher quantity of stops and/or the more amount of time a vehicle spends at a stop or at a particular speed, the lower the road flow score. Accelerometer, gyroscopes, or any other movement sensors can be used to calculate the road flow score. For example, for every decreased spike in movement an accelerometer experiences, this may equate to a respective stop or movement below a threshold, which is counted or scored towards a lower road flow score. A road flow score can additionally or alternatively be calculated via a BPS or other brake sensor, and/or measuring the distance and time passage between one or more GPS data points. For example, if GPS samples were uniformly sampled every 1 minute, and a first car driving on a first road traveled 2 miles between samples, and a second car driving on a second road travelled 1 mile between samples, the first road may have a higher road flow score because more miles were driven on the first road by the first car. In some embodiments, the road flow score is additionally or alternatively calculated via a torque sensor that measures the quantity of force a driveshaft is subjected to. Torque sensors convert a torsional mechanical input into an electrical output signal. Torque is measured by sensing the shaft deflection caused by a twisting force.

A road comfort score indicates how comfortable a driver will be while traversing a particular road or section of road. In some embodiments, accelerometer or other motion sensor readings (e.g., different roll, yaw, and heave) are used to indicate the road comfort score. The more movement the vehicle experiences, the lower the road comfort score is or the less comfortable a road will be for traversing. Drivers typically want to drive on more comfortable roads if travelling a long distance. Alternatively, if a driver is looking to go off-road, the driver may desire to travel on a less comfortable road or a road with a lower road flow score. For roads that are dirt roads or have other obstacles, such as rocks, fallen trees, bushes or the like, the vehicles that traverse them will typically experience more movement and thus the driver will be less comfortable.

A road safety score indicates how safe a particular road or section of a road is. Road safety can be gauged via a variety of sensors, such as a torque sensor, a braking sensor (e.g., BPS), an accelerometer, a crash sensor, and/or a set of Advanced Driver Assistance Sensors (ADAS), which can include one or more of: lidar, radar, cameras, ultrasonic sensors, and infrared sensors. The higher the torque, the less safe a road is or lower the road safety score. The more a vehicle breaks, the less safe a road is or lower the road safety score. If a vehicle is detected to crash (e.g., via a SRS or airbag sensor), the corresponding road is scored to be less safe. The more movement a vehicle experiences, the less safe a road is or the lower the road safety score. The specific category or quantity of objects detected in a road (e.g., via the ADAS sensors) or in a corresponding environment (e.g., low hanging trees), the less safe a road is. For example, if an object detection camera detects cows in the road at a certain time of year, that road is scored as unsafe at the particular time of year due to the risk of crashing into a cow.

Lidar (Light Detection and Ranging) sensors detect objects and build a map of a geographical environment based on transmitting a plurality of light pulses a second and measure how long it takes for those light pulses to bounce off of objects in the environment back to the sensor (e.g., 150,000 pulses per second). These lidar sensors can indefinitely spin transversely in a plane parallel to the ground capturing a 360-degree image of a vehicle's surroundings. The output is a three-dimensional mapping of the geographical environment. These sensors can also calculate the distance between itself and the objects within the environment, as well as detecting exact sizes, colors, shapes of objects, and/or other metadata.

Radar sensors are similar to radar sensors in that they also transmit signals and measure how long these signals take to bounce off objects back to the sensor. However, these signals are radio waves, instead of light pulses (which are faster). These sensors detect road dynamics, such as detours, traffic delays, vehicle collisions, and other objects. Long range radar typically detects objects further away compared to lidar, whereas lidar typically detects objects that are less far away and is used for emergency braking, pedestrian detection, collision avoidance, etc.

Camera sensors typically utilize object recognition or computer vision algorithms to detect and classify objects on the road, such as lane lines and traffic signs (which can also be used to indicate a quantity of lanes, as described above). These cameras can provide images to computing devices for determining depth of field, peripheral movement, and dimensionality of objects. In some embodiments, these cameras use deep learning or other machine learning models and techniques for object classification. For example, in some embodiments, convolutional neural networks (CNN) are used to detect and classify objects, such as determining and classifying objects (e.g., car, person, traffic light, etc.). These cameras can be used for short-distance recognition, such park assistance, compared to other sensors, such as lidar.

Figure 8:
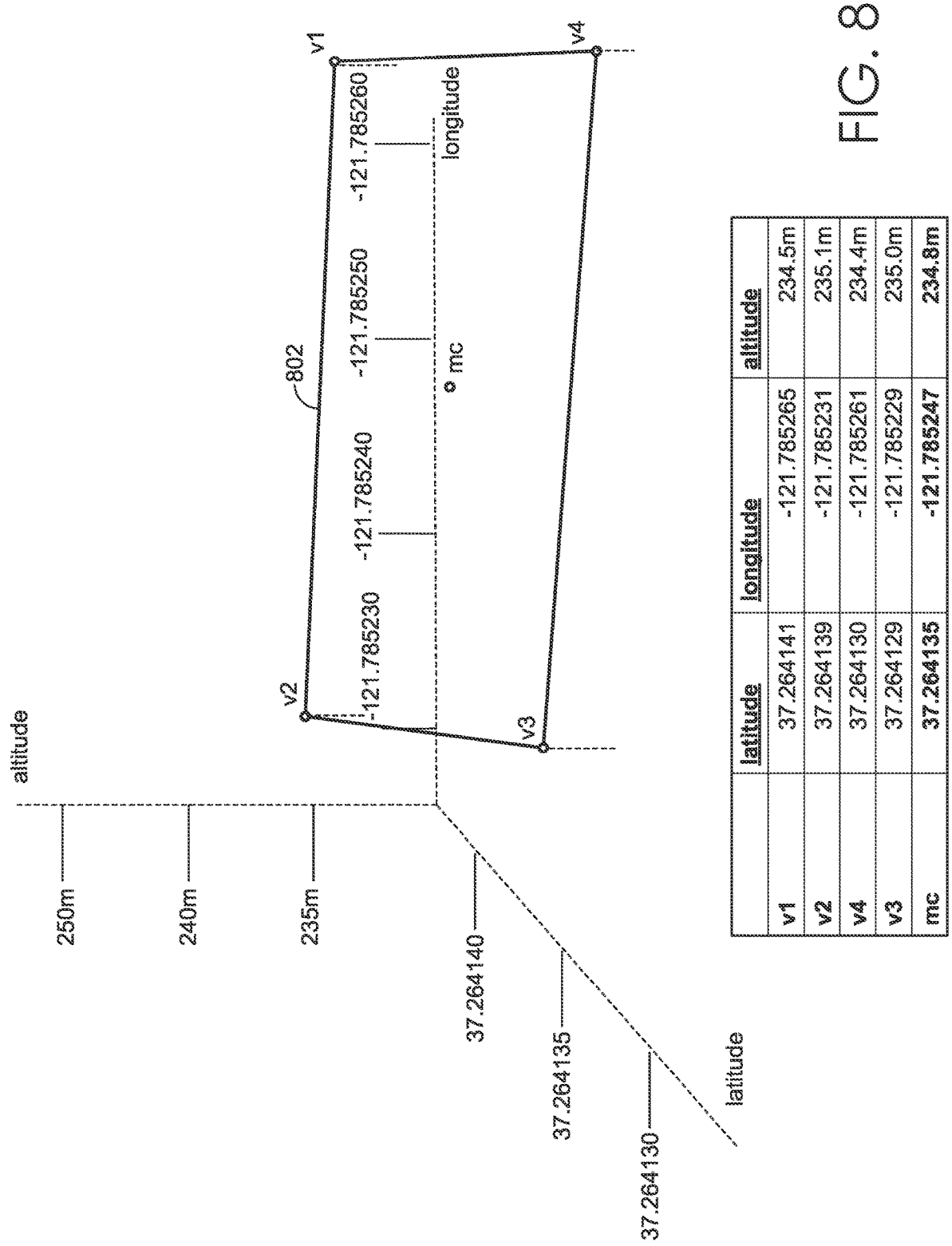
FIG. 8 is a schematic diagram illustrating a three-dimensional road segment data structure, according to some embodiments.

Turning now to FIG. 8, a schematic diagram illustrating a three-dimensional road segment data structure, according to some embodiments. Specifically, the three dimensions are latitude (e.g., the width or X-axis width of a lane), longitude (e.g., the Y-axis length of the specific road segment data structure), and the altitude (e.g., the Z-axis depth, horizontal slope, and/or vertical slope of the road segment data structure). In some embodiments, a road segment data structure is planar in dimension, existing as a flat surface in three-dimensional space (though it has finite boundaries). If the road is perfectly flat (lying flat on the earth's surface), there is no variance in altitude from one vertex to another, but practically, this is rare. The typical surface has both non-zero horizontal and vertical slope. In some embodiments, such slope is stored in the "gradient" and "gradient_lateral" fields of the road segment data structure. In some embodiments, the "gradient" is the slop at the midpoint (mb→mt), whereas the "gradient_lateral" is the slope from the midpoint of (v1, v4) to the midpoint of (v2, v3). V1, v2, v3, v4, and mc all represent respective vertices.

Figure 9:
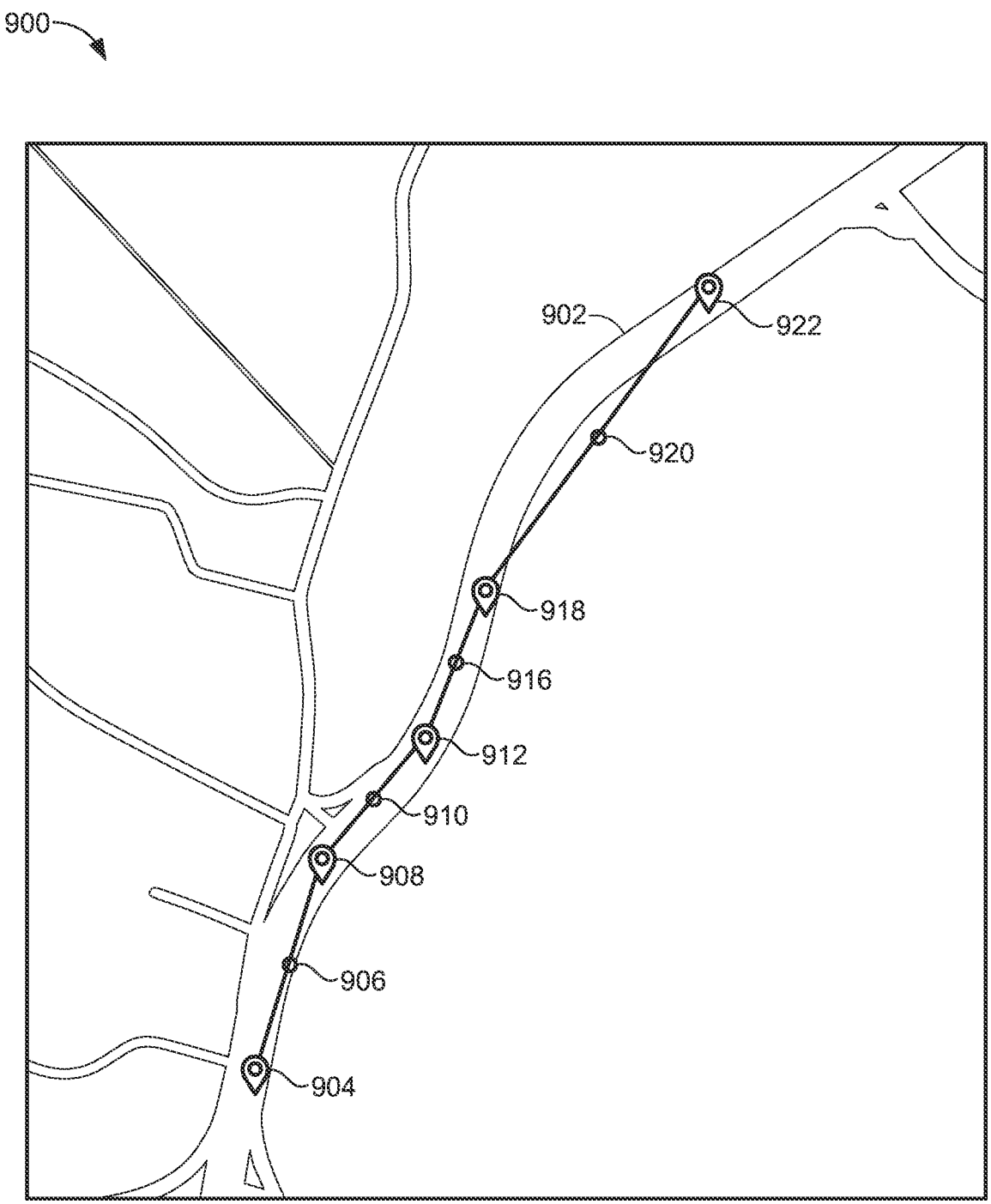
FIG. 9 is a screenshot of an example electronic map that illustrates an example historical track that includes nine directional data points indicating different attribute values at different section of the road, according to some embodiments.

FIG. 9 is a screenshot 900 of an example electronic map that illustrates an example historical track that includes 9 directional data points—904, 906, 908, 910, 912, 916, 918, 920, and 922—indicating different attribute values at different section of the road 902, according to some embodiments. In some embodiments, the screenshot 900 is produced by the presentation component 215 of FIG. 2. In some embodiments, the road indicator 902 (representing an actual road) has already been superimposed or otherwise been associated with respective road segment data structures, as described, for example, with respect to FIG. 4 through FIG. 8.

The screenshot 900 illustrates that one or more vehicles have traversed the road 902 (i.e., Page Mill Road) from data point 904 to data point 922 (e.g., from South to North). A "data point" is a time at which one or more vehicles (or sensors/computing devices located on the vehicles) have detected or otherwise sampled sensor data, such as GPS latitude coordinates, accelerometer readings, gyroscope readings, and the like. Such sampling may take place every N time interval. As illustrated in the screenshot 900, data points 904, 908, 912, 918, and 922 are GPS data points (i.e., a latitude and longitude was detected for a vehicle/sensor at a time interval), whereas data points 906, 910, 916, and 920 are any other sensor data readings. For example, in some embodiments, at data point 906, an air suspension mode sensor can detect that the suspension mode (a first attribute) has a value of "high," and data points 910 and 920 indicate a particular wh/mile reading, and data point 916 indicates a particular odometer reading, as illustrated, for example, in table 3 below:

TABLE 3

| Data Point | Time | Direction | Data Type | Value |
|---|---|---|---|---|
| 904 | T1 | N | GPS | 37.3918, −122.16287 |
| 906 | T2 | N | air suspension mode | high |
| 908 | T3 | NNE | GPS | 37.39311, −122.16234 |
| 910 | T4 | NE | wh/mile | 490 |
| 912 | T5 | NE | GPS | 37.39387, −122.16152 |
| 916 | T6 | NE | odometer | 45344 |
| 918 | T7 | NNE | GPS | 37.3948, −122.16106 |
| 920 | T8 | NE | wh/mile | 478 |
| 922 | T9 | ENE | GPS | 37.3967, −122.1593 |

In some embodiments, the processing pipeline for each data point buffers data until a location (GPS) point is encountered. This allows for location interpolation for each data point, providing the data point a location. In some embodiments, the algorithm generates what is referred to as "synthetic" data points between the previous location (starting point) and current location (ending point), which is data point 904 and 922 respectively in FIG. 9. In some embodiments, each synthetic data point is 1 cm from the previous point (either the starting point or a previous synthetic point) and is given an appropriate timestamp relative to the starting point. For example, as illustrated in table 3 and FIG. 9, at 1 cm, that is approximately 59,000 synthetic points.

In some embodiments, synthetic points are generated using two different approaches. If the starting point (904) and ending point (922) are "off-road", a direct line approach is used-synthetic points are generated on the line connecting the starting point to the ending point. However, if the starting point and ending point are on "on road," then synthetic points follow the road, as illustrated, for example, by the synthetic points 1008 of FIG. 10.

Figure 10:
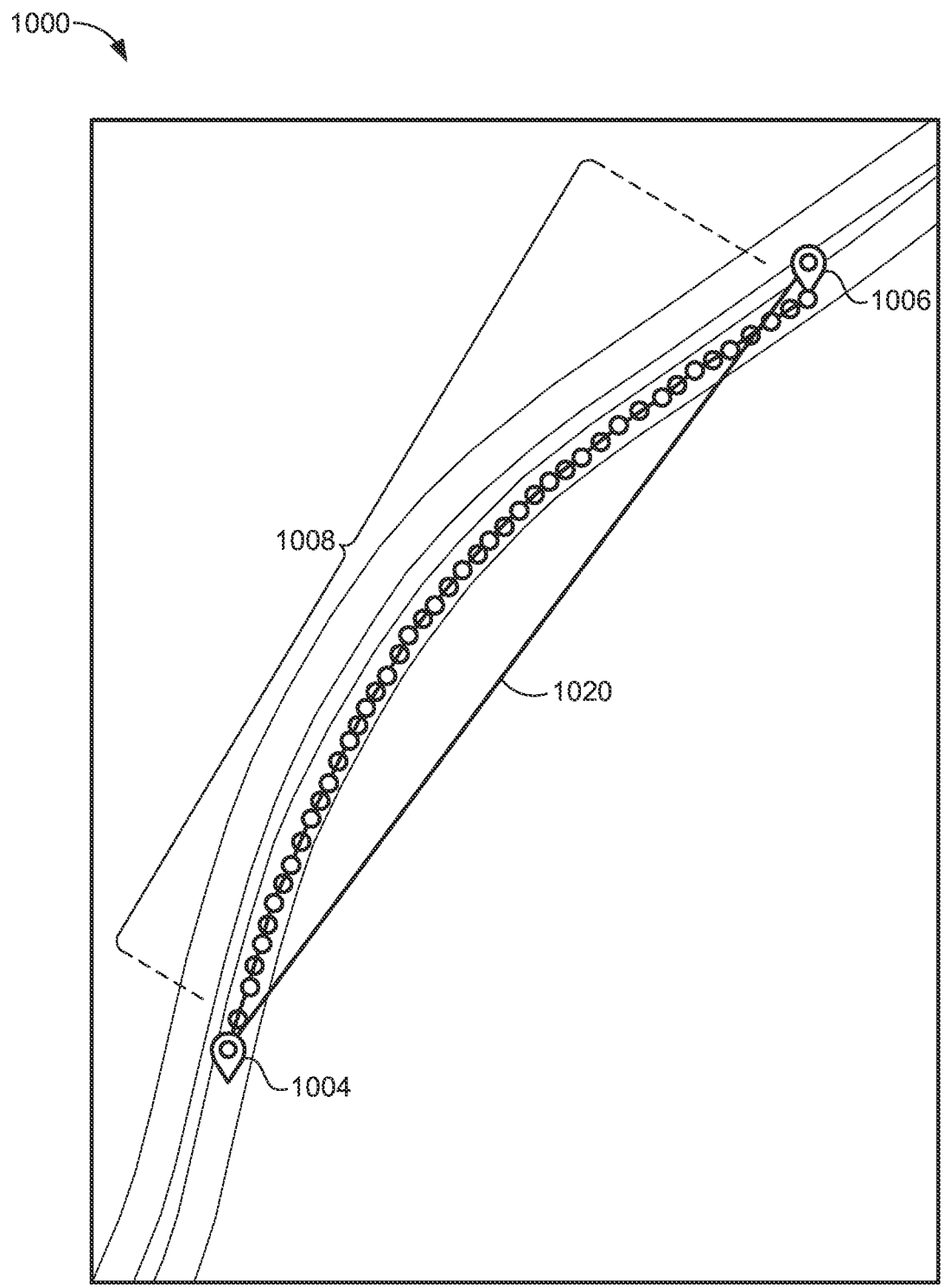
FIG. 10 is a screenshot of an example electronic map illustrating which paths or tracks are off-road or on-road via use of synthetic points, according to some embodiments.

FIG. 10 is a screenshot 1000 of an example electronic map illustrating which paths or tracks are off-road or on-road via use of synthetic points, according to some embodiments. As described above, if the starting point 1004 and ending point 1006 are off-road, a direct line 1020 is superimposed or presented, which connects data pint 1004 and 1006, as illustrated in the screenshot 1000. In some embodiments, synthetic data points similar to 1008 are additionally superimposed or connected to the line 1020 to indicate this. Alternatively, if the starting point 1004 and ending point 1006 are on-road, synthetic data points follow the road, as illustrated by 1008.

Figure 11:
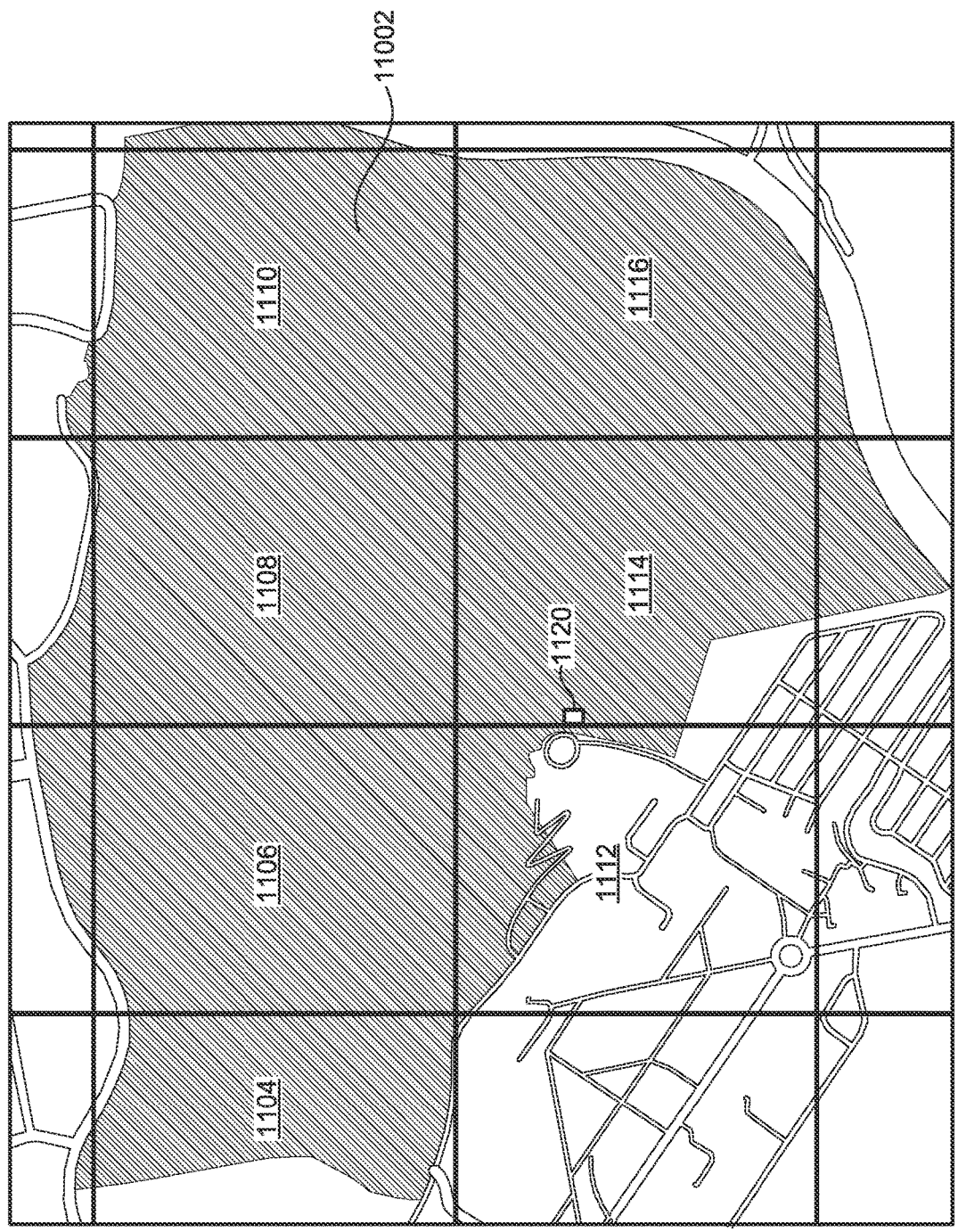
FIG. 11 is a screenshot of an example electronic map, which is broken up into different geographical areas corresponding to different grid data structures, according to some embodiments.

FIG. 11 is a screenshot 1100 of an example electronic map, which is broken up into different geographical areas corresponding to different grid data structures, according to some embodiments. FIG. 11 illustrates that a particular geofence area 11002 (i.e., Montgomery Hill Park) is broken up into mainly seven different sections corresponding to grid data structures 1104, 1106, 1108, 1110, 1112, 1114, 1116, and 1118. In some embodiments, the grid data structure component 209 of FIG. 2 is responsible for generating or deriving attribute values inside of the grid data structures.

In some embodiments, each data point (e.g., a GPS data point) is scored using a grid system, such as a high-resolution grid, as indicated in FIG. 11. In some embodiments, such as with respect to GOOGLE Plus Codes, planet earth is divided into small (~2 cm wide×5 cm high) rectangles, aligned to the geographic coordinate systems (latitude and longitude). Some embodiments map each GPS location to one of these rectangles. In some embodiments, this grid system does not "align" to roads, rather is an overlay onto the road system (and every other terrestrial area on earth). Using an uncoupled grid system (not a "road grid") allows tracking of vehicles in both on-road and off-road locations. In this way, and in some embodiments, road segment data structures can be nested, embedded into, or otherwise associated with grid data structures.

In some embodiments, the grid system used is the Open Location Code system (e.g., "Google Plus Codes"). Plus codes divide earth into an addressable grid. The size of the grid rectangles vary depending on the plus code length. At length 8, for example, each grid rectangle is 278 m×278 m. At length 14 each grid rectangle is 2 cm wide by 5 cm high.

In some embodiments, when data is off-road, data is returned by grouping adjacent scoring rectangles into larger grid rectangles (data structures). This is easy with the plus code system as it is inherently a nested grid system. For example, to get data within Montgomery Hill Park (i.e., the geofence 1102), the get_in API (described below) can be used. The caller would provide a polygon that roughly approximates the boundary of the park.

Continuing with FIG. 11, Montgomery Hill Park 1102 is largely contained within 7 plus codes of code length 8. Each are of precision 278 m. The small square 1120 is plus code 849W862R+M2 (code length 10), precision 13.9 m. The relevant APIs will accept a plus code 8 or plus code 10, returning data aggregated in plus code 12 rectangles (precision of approximately 1 m square).

Some embodiments utilize a RESTful API for data access. In some embodiments, there are three principle "get" calls in order to derive attribute values within one or more grid data structures or road segment data structures: get_from: gets data from one data point to another, usually on a road (e.g., as illustrated by points 504 and 502 of FIG. 5), get_at: gets data around a single data point (e.g., data point 906 of FIG. 9), and get_in: gets data within a broader polygon (e.g., multiple roads of a single grid data structure or multiple grid data structures).

Figure 12:
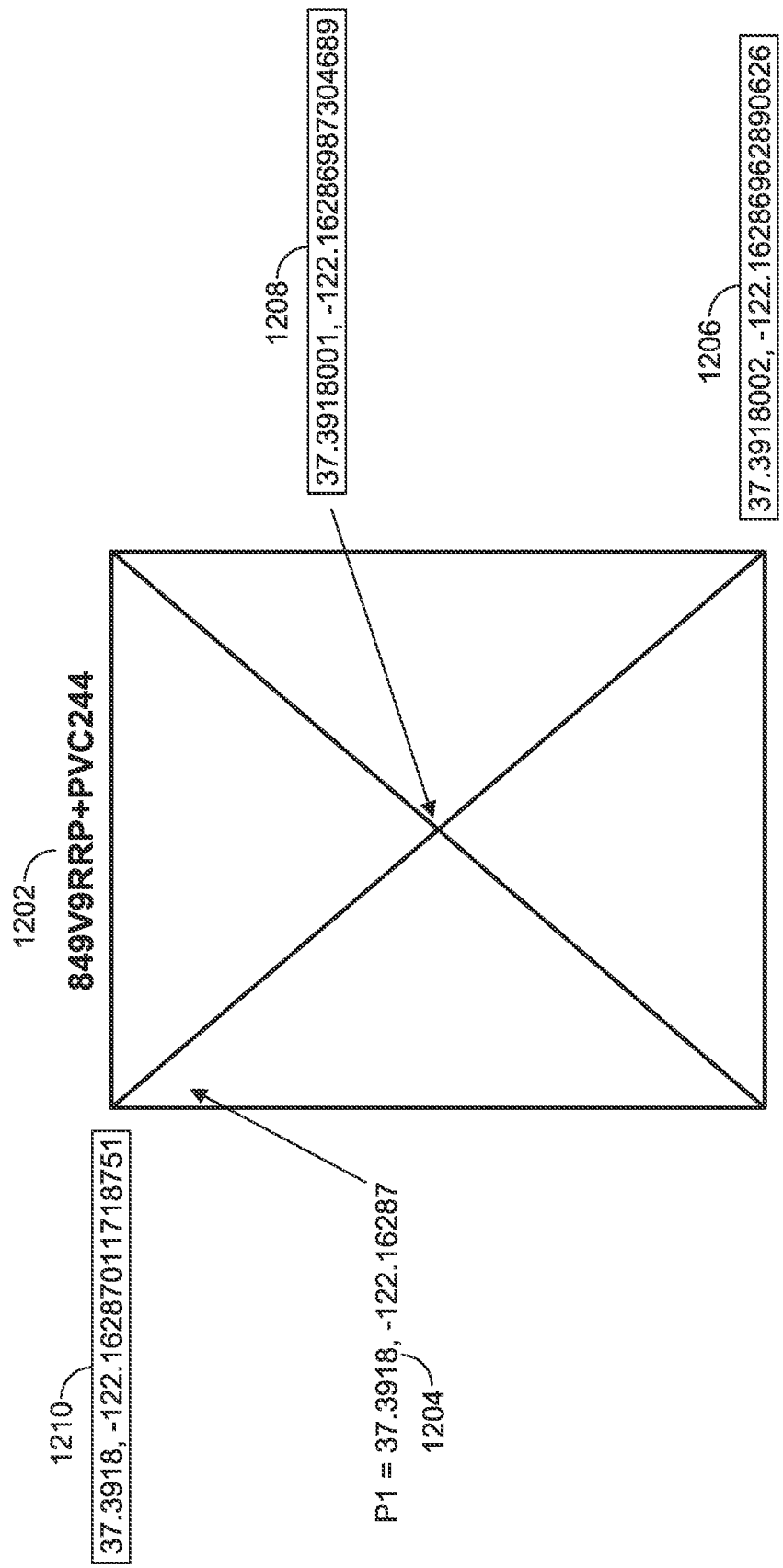
FIG. 12 is a schematic diagram of a grid data structure, according to some embodiments.

FIG. 12 is a schematic diagram of a grid data structure, according to some embodiments. For each latitude and longitude coordinate, there is a mapped plus code. For example, 120s4 (i.e., P1 @ 37.3918, −122.16287) maps to plus code (at code length 14) 1202 (i.e., 849V9RRP+PVC244). Data points close to particular points may also map to the same plus code, hence it "groups" close by data points (those within the same 2 cm×5 cm rectangle). Data points 1208, 1206, and 1210 are also mapped to the ID 1202.

In light of FIG. 9, and in some embodiments, for each data point and synthetic point7: (1) (If not a location point), a location is assigned by searching the synthetic points for the nearest timestamp. (2) A direction (bearing) is assigned based on examining the previous and following synthetic or natural points. (3) The data point is encoded to its grid data structure rectangle (e.g., P1 @ 37.3918, −122.16287→849V9RRP+PVC244). (4) Using the grid rectangle designation and direction, the data is recorded, as described herein. Using the plus-code and direction (the "key" tuple) the scoring object is either created or updated in some embodiments. The key tuple in our example scoring P1 is (849V9RRP+PVC244, N).

In some embodiments, each scoring object or grid data structure holds a number of global attributes and values, which include one or more of the following as indicated in table 4:

TABLE 4

| Attribute | Description |
| --- | --- |
| plus_code (key) | string; google plus code |
| direction (key) | enumeration: N, NNE, NE etc.; direction |
| first | timestamp; first data time |
| last | timestamp; last data time |
| location | GPS tuple (lat, lon); the center point |
| location_type | enumeration: synthetic, normal |
| location_accuracy | float, radial accuracy (in meters) |
| alt | float, the altitude (in meters) |
| count | integer, number scored |
| unique_count | integer, number scored, unique vehicles |
| type | enumeration: on-road, off-road |

In some embodiments, grid data structures hold the location and location type: synthetic or normal. In some embodiments, the location is held distinctly from the plus_code (even though it could be inferred) for spatial indexing purposes. In some embodiments, the grid data structures maintain a count (the number of times data was added to the scoring object) and a unique count (the number of unique vehicles contributing data).

In some embodiments, each grid data structure holds one or more properties or other attribute values. In some embodiments, this is just the location (for a normal or synthetic location). In some embodiments, each property maintains one or more of the following information, as illustrated in table 5 below:

TABLE 5

| Property Attributes | Description |
| --- | --- |
| property | string; property name |
| first | timestamp; first data time |
| last | timestamp; last data time |
| count | integer, number scored |
| unique_count | integer, number scored, unique vehicles |
| last | float, last value |
| max | float, maximum value |
| min | float, minimum value |
| ave | float, average value |
| stdev | float, standard deviation |
| attributes | → null or attribute definition |

As table 5 illustrates, grid data structures can be qualified with describing attributes. In some embodiments, these attributes distinguish the contributing data source (i.e., vehicle). For example, these grid data structures may indicate which vehicle IDs traversed the corresponding section represented by the grid data structure. In some embodiments, if null, the grid data structure is considered "from any vehicle." In some embodiments, a property is recorded with the null attribute designation but may also have one or more attribute sets. For example, if the property "wh/mile" is scored, the null attribute as well as two other properties are stored: attribute: vehicle_model (R1T, R1S, RPV), and vehicle_model+battery_pack_size (105, 135, 180).

Essentially, in some embodiments, an attribute set per property is scored where a distinction in the data is desired (e.g., show wh/mile for Brand A model B vs Brand A model C vehicles). In some embodiments, the processing pipeline maintains a property and attribute set processing directive. This directive instructs the processing pipeline on what properties to store with what distinguishing attribute sets.

Figure 13:
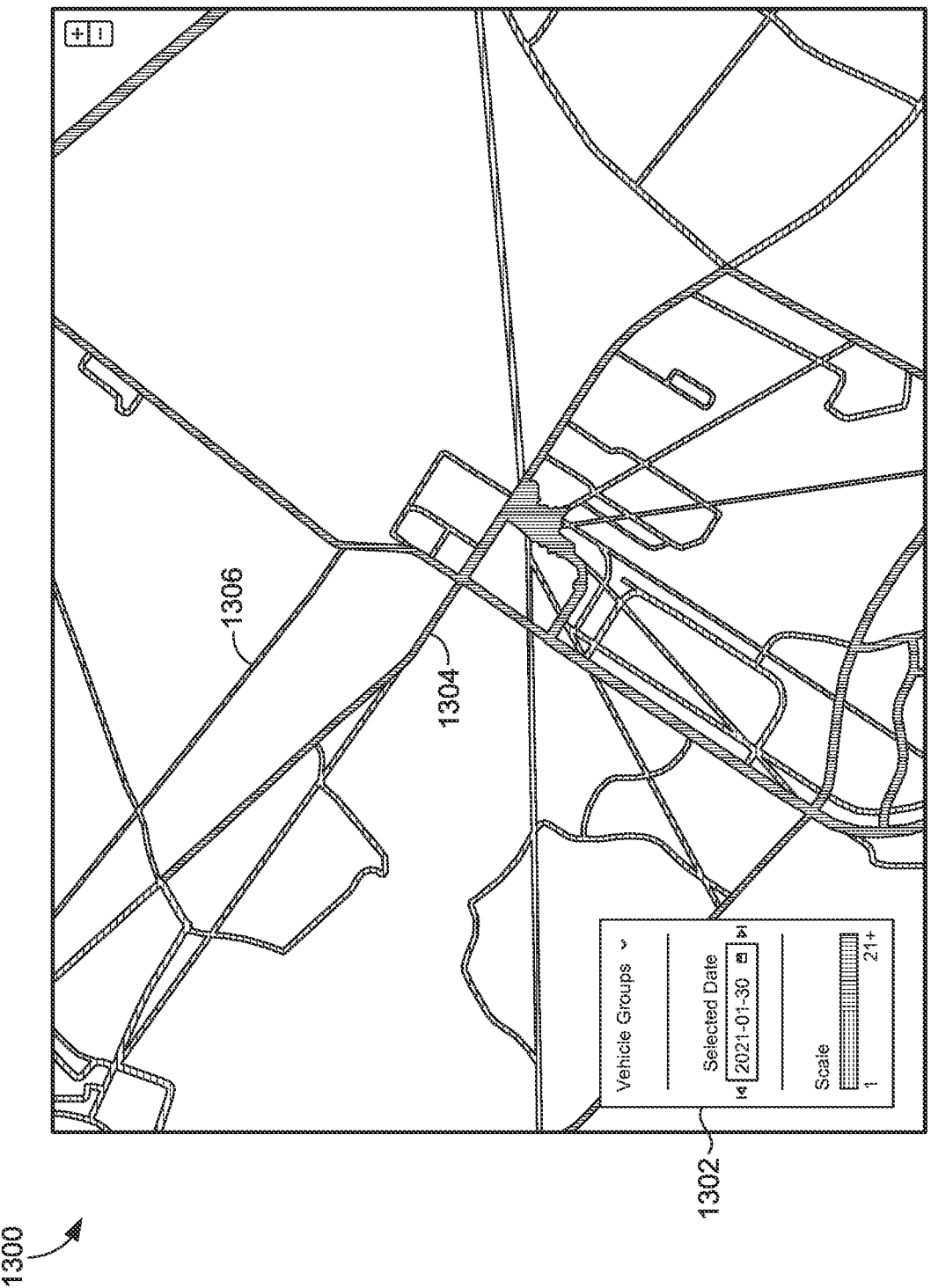
FIG. 13 is a screenshot of an example heat map, according to some embodiments.

FIG. 13 is a screenshot of an example heat map 1300, according to some embodiments. In some embodiments, the heat map 1300 is produced via the heat map generator 215 of FIG. 2. The heat map 1300 includes a key 1302, "hot" or color-coded (e.g., red) roads 1304, and "cold" or color-coded (e.g., blue) roads 1306.

For many vehicle-related data questions, answering where visually is key to understanding complex and large data sets. Just invoking the word map implies something visual. In some embodiments, vehicle data sets are maintained in a car manufacturer's big data system. Data analysis and modeling solely within this system answers many questions but not typically where something happened. This is particularly true when the data set in question is an aggregation of different vehicle's data, either as a fleet (e.g., all Make A and model B cars) or a cohort (e.g., all make A, model B cars with All-Terrain tires). For example, if the question is: where do brand A vehicles go when they venture off-road, clearly a visual answer is appropriate.

Heat maps are a fantastic visual tool to understanding where and at what frequency or intensity something occurred. Heat maps show data in aggregation. In some embodiments, the heat map 1300 illustrates the frequency of location "visits" within a car manufacturer's test fleet—in other words, where does the test fleet go? For example, the more vehicles that traverse a road (e.g., as determined by the vehicle sensor data collection component 205), the warmer the color is and the thicker the line representing the road will be. Conversely, the less vehicles traverse a road the cooler the color and thinner the line representing the road will be. Faint thin blue lines, such as in 1306, for example, show a single vehicle or infrequent track, whereas a thick red line shows frequent vehicle use of a roadway, as indicated in 1304. In some embodiments, vehicle visit frequency, as indicated at the heat map 1300, is calculated by sampling data points, as illustrated, for example, with respect to FIG. 9. The more sets of data points that are generated for different vehicles for a single road, the higher or hotter intensity a road will be.

As illustrated at the key 1303, a user selects or otherwise inputs a date (or date range) in order to produce a heat map of vehicle frequency according to the date. For example, at a first selected date, the heat map may resemble 1300. However, at a second later-in-time selected date range, the heat map 1300 may change such that 1306 is now hot indicating that more vehicles traversed this road relative to the first selected date.

Figure 14:
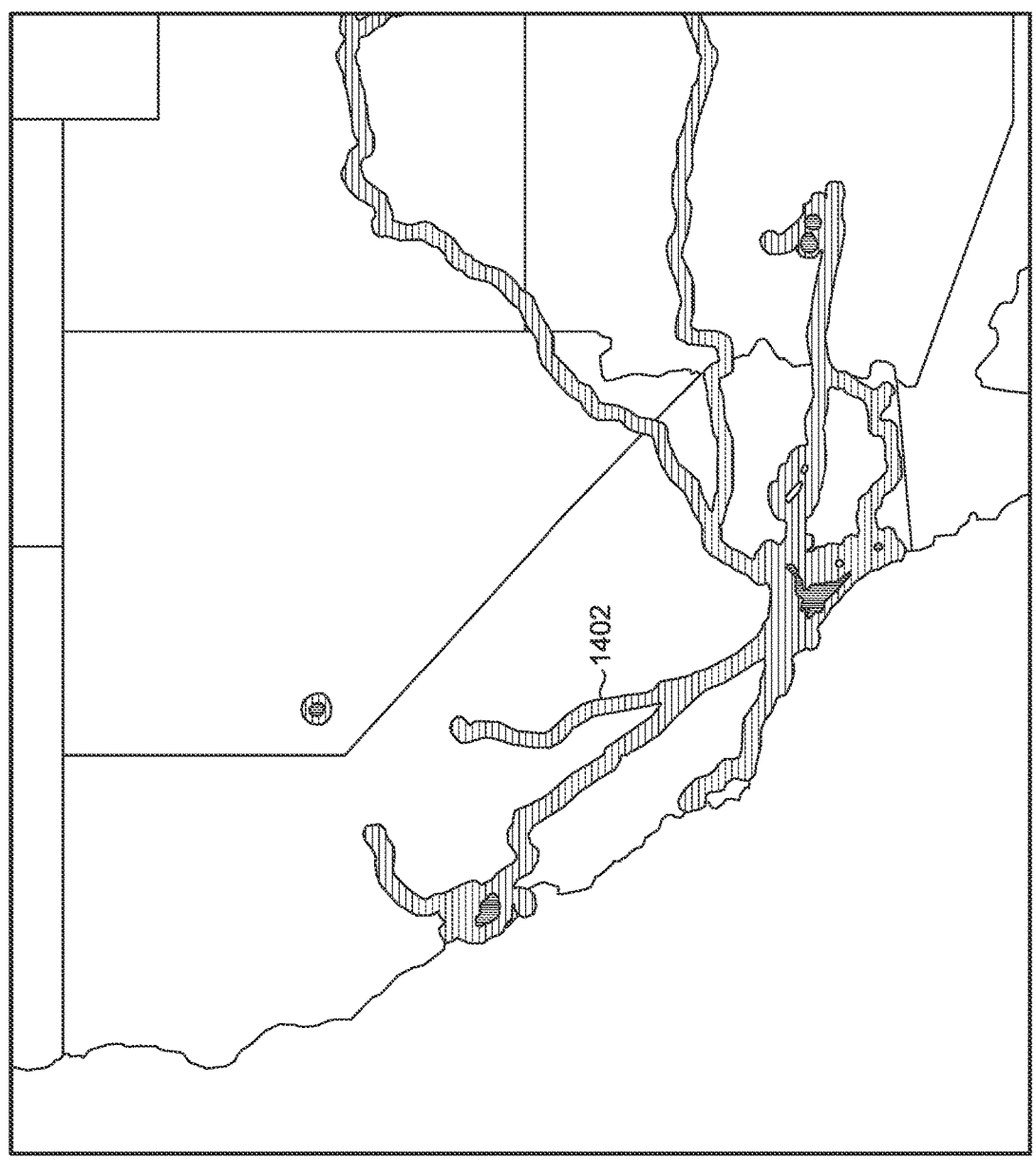
FIG. 14 is a screenshot of another example heat map, according to some embodiments.

FIG. 14 is a screenshot of another example heat map 1400, according to some embodiments. In some embodiments, the heat map 1400 is produced via the heat map generator 215 of FIG. 2. The heat map 1400 illustrates that vehicle frequency can be indicated at a broad level relative to the heat map 1300 of FIG. 13. Instead of indicating a vehicle frequency at a local geographic area, the vehicle frequency can be indicated by a larger geographical area, such as a country (the United States in FIG. 14). With respect to FIG. 14, higher vehicle frequency is indicated by the lines 1402 and for lower vehicle frequency there are no lines.

Figure 15:
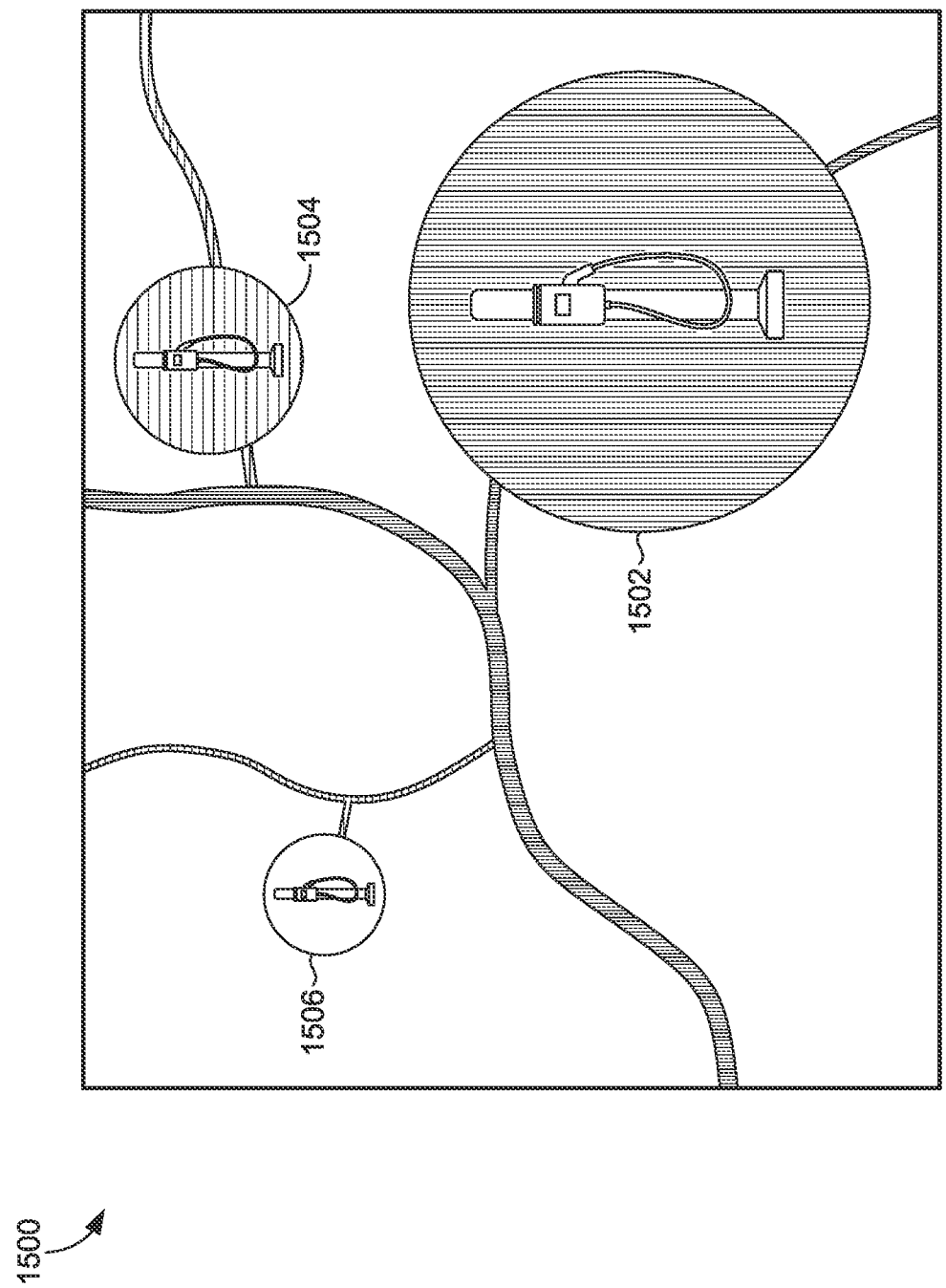
FIG. 15 is a screenshot of another example heat map, according to some embodiments.

FIG. 15 is a screenshot of another example heat map 1500, according to some embodiments. In some embodiments, the heat map 1500 is produced via the heat map generator 215 of FIG. 2. The heat map 1500 includes three indicators 1502, 1504, and 1506, which represent respective charging stations.

The indicators 1502, 1504, and 1506 represent locations where electric vehicles can charge. Electric vehicles can charge at a variety of charging stations. Charging will happen at home, at work, on 3rd party charge infrastructure (e.g., ChargePoint), and a vehicle manufacturer's own network (RIVIAN Adventure Network). The presentation of the heat map 1500 is a way to visualize charge activity in a variety of dimensions. For example, the indicator 1502 can be presented as dark red in color and large, which indicates that the corresponding charging station is frequented more, relative to, for example, a charging station represented by indicator 1504, which is a blue color and smaller. Using a map style interface and data collected by a maps platform, various other origin data sets can be visualized. For example, starting with the type of charge (e.g., Level 1, DC fast charge), users can visualize a heat map of charging locations by type. The same type of visualization can be applied to charge station categorization (e.g., work, home, public) and charge station ownership models (consumer, RAN, 3rd party by company).

The heat map 1500 provides visualization where the charge event took place. However, for any given charge location, further heat maps could show routes taken (e.g., the heat map 1300 of FIG. 13). This is a highly effective tool to understand where vehicles go after using charge stations-allowing for future site planning, for example. In all cases, heat maps can be provided by time (a specific week or week over week comparisons). In some embodiments, charging station frequency, as indicated at the heat map 1500, is calculated by sampling data points, as illustrated, for example, with respect to FIG. 9. The more sets of data points that are generated for different vehicles for a single charging station, the higher or hotter intensity an indicator representing a charging station will be.

Figure 16:
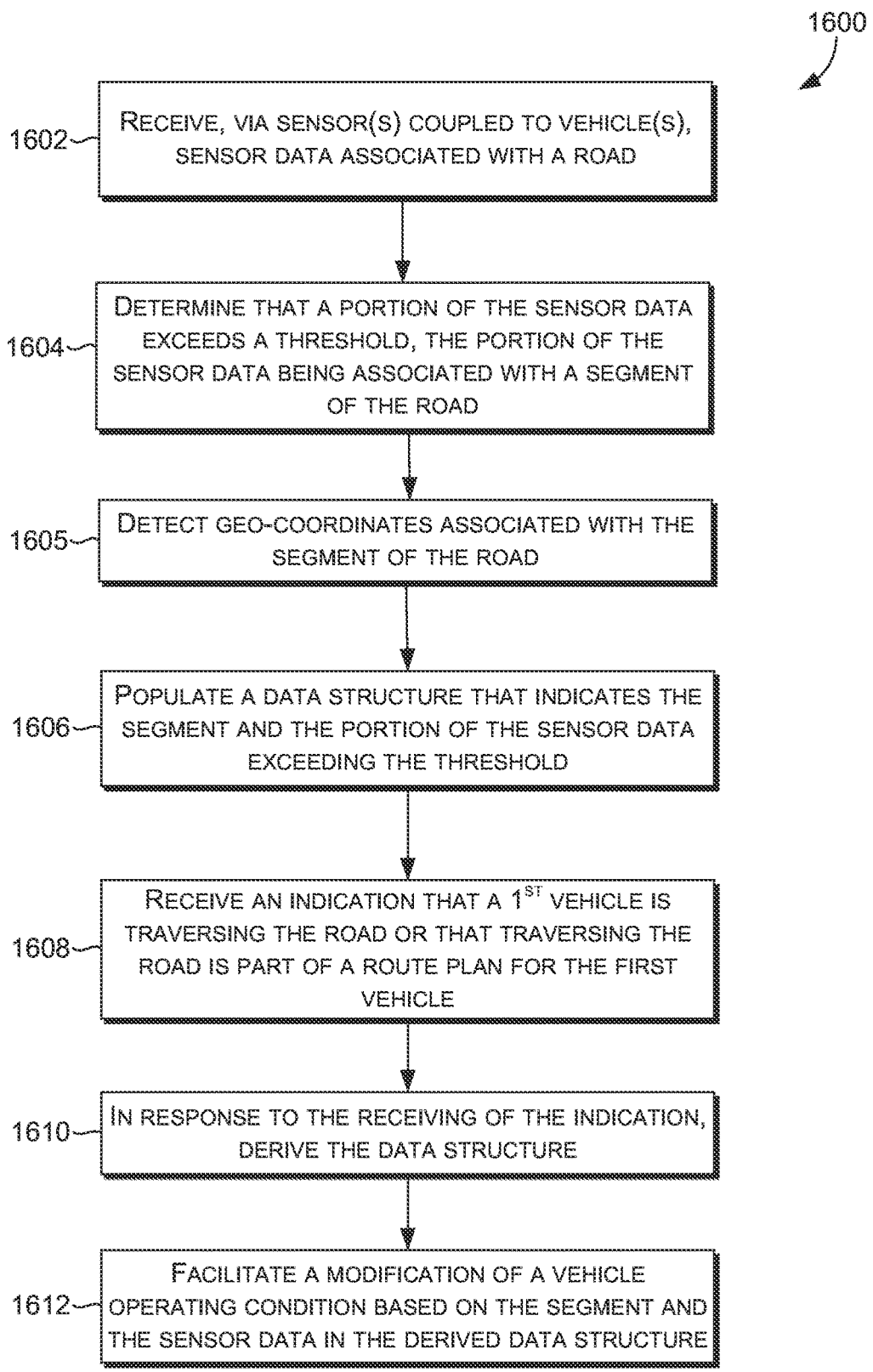
FIG. 16 is a flow diagram of an example process for populating one or more data structures based on sensor data and facilitating a modification of a vehicle operating condition, according to some embodiments.

FIG. 16 is a flow diagram of an example process 1600 for populating one or more data structures based on sensor data and facilitating a modification of a vehicle operating condition, according to some embodiments. The process 1600 (and/or any of the functionality described herein) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIG. 1 through FIG. 18). The computer-implemented method, the system (that includes at least one processor and at least one computer readable storage medium), and/or the computer readable medium as described herein may perform or be caused to perform the process 1600 or any other functionality described herein.

Per block 1602, some embodiments receive, via one or more sensors coupled to one or more vehicles, sensor data associated with a road. For example, some embodiments detect, via one or more sensors coupled to vehicles, sensor data in near-real-time relative to or while the vehicles traverse a road in a geographical area. In other embodiments, some embodiments receive the sensor data based on the vehicle(s) traversing the road in any non-real-time context, such as receiving sensor data in batched intervals every X minutes. "Detecting" or "receiving" the sensor data can occur by the sensors themselves or by a computing device (e.g., computing device(s) 105), that receives, over a network, sensor data from the sensors. In some embodiments, block 1602 includes the functionality as described with respect to the vehicles 120 of FIG. 1 or the vehicle sensor data collection component 205 of FIG. 2. In some embodiments, the one or more vehicles at block 1602 represent a fleet of logistics vehicles that are configured to delivery one or more parcels and/or a group of vehicles of a same make that are driven by customers, as described herein.

Per block 1604, some embodiments determine that a portion of the sensor data exceeds a threshold, the portion of the sensor data being associated with a segment of the road. The "portion" of sensor data, for example, can be a set of one or more sensor data values of one or more particular sensors. The "threshold" can be any suitable value, such as a specific sensor range or value. In an illustrative example of block 1604, some embodiments run the sensor data against a set of conditional statements and determine whether an accelerometer value (e.g., the "portion" of the sensor data) exceeds an accelerometer value threshold, where the accelerometer value was experienced at some segment or portion of the road. In some embodiments, block 1604 includes the functionality as described with respect to the road classifier 224 and/or the road scoring component 230 of FIG. 2.

Based on the determining that the portion of the sensor data exceeds (or does not exceed) the threshold, some embodiments generate a score that includes one or more of: a vehicle efficiency score for the segment, a vehicle wear and tear score for the segment, a rod flow score for the segment, a road comfort score for the segment, a road safety score for the segment, a suspension mode score for the segment, one or more geo-coordinates of the segment, a lane identifier that identifies one or more lanes of the segment, a direction of traffic flow of the one or more lanes, an indication of whether the segment is part of an off-road path or is part of a street, and/or a difficulty score of the segment, as described herein (e.g., as described via the road scoring component 230 or the road classifier 224). Such score can be any score as described with respect to the road scoring component 230 of FIG. 2. For example, as described herein, if an accelerometer, gyroscope, lidar, radar, camera, brake, or other sensor reading exceeds a threshold, meets a threshold, or falls outside of a threshold, different scores can be generated, such as a road comfort score or road efficiency score, as described herein.

Particular embodiments normalize and structure the sensor data (e.g., in response to block 1602) before block 1604 occurs such that the "portion" of the sensor data is already normalized. For example, a processor, executing the vehicle sensor data collection component 205, can normalize the sensor data by changing the scale of values and populating null fields and performing an ETL process, as described with respect to the vehicle sensor data collection component 205 of FIG. 2. Responsively, some embodiments then perform block 1604.

Per block 1605, some embodiments detect geo-coordinates (e.g., GPS latitude and longitude) associated with the segment of the road. "Detecting" the geo-coordinates can include receiving, by a computing device and over a computer network, the geo-coordinates from sensor(s) located at the vehicle(s). Detecting can also include determining the geo-coordinates, such as by a location module or device located at the vehicle(s). In an illustrative example of block 1605, in some embodiments, the sensor data received at block 1602 includes geo-coordinates. In other words, as (or after) a vehicle is traversing the road, a location (e.g., GPS) sensor coupled to the vehicle, for example, can transmit, to the computing device(s) 105, its coordinates every X time interval (e.g., 1 second). At the same time, other sensors (e.g., an accelerometer) transmits its coordinates at the same X time interval. Some embodiments, can then map the coordinates to other sensor data based on the same time X interval to infer that the vehicle experienced some event (e.g., accelerometer spiked over Y threshold) at some specific segment or coordinates in the road. In this way, the geo-coordinates are associated with the segment of the road.

However, the geo coordinates at block 1605 need not be continuously detected or transmitted. Rather, in some embodiments, the geo-coordinates and/or data structure at block 1606 are only detected/generated in response to the determining that the portion of the data exceeds the threshold. For example, only in response to an on-vehicle chip processor determining that the portion of the data exceeds the threshold, the on-vehicle chip processor automatically (without a user request) transmits the geo-coordinates of the location device on the vehicle. Such transmitting of the geo-coordinates is thus indicative of a particular segment of the road that has experienced some event associated with the sensor data exceeding the threshold. Responsively, some embodiments then generate the data structure derived at block 1606.

Per block 1606, some embodiments populate a data structure that indicates (e.g., represents) the segment and/or the portion of the sensor data exceeding the threshold. For example, in response to the detecting of the geo-coordinates at block 1605, some embodiments populate the data structure with such geo-coordinates (or an identifier that represents the geo-coordinates), which "indicates the segment." Some embodiments additionally or alternatively populate the data structure with sensor attributes (e.g., accelerometer, gyroscope, break, camera, etc.) and sensor values that have exceeded the threshold, which "indicates the portion of the sensor data exceeding the threshold." Alternatively or additionally, the score described with respect to block 1404, the road scoring component 230, and/or the road classifier 224 can be populated to the data structure, which also "indicates the portion of the sensor data exceeding the threshold."

In some embodiments, the data structure populated at block 1606 represents one or more of the data structures described herein, such as the road segment data structure 408 of FIG. 4, the road segment data structure 502 of FIG. 5, the road segment data structure 602 of FIG. 6, the road segment data structure 700 of FIG. 7, the road segment data structure 802 of FIG. 8, the grid data structure of FIG. 12, or the like, as well as include any of the additional data described herein.

Per block 1608, some embodiments receive an indication that a first vehicle is traversing the road or that the traversing the road is part of a route plan for the first vehicle. For example, the "indication" received at block 1608 can be geo-coordinates of the first vehicle. Some embodiments then map those geo-coordinates to the road, e.g., via a data structure, and so embodiments receive an indication that the first vehicle is traversing the road. In some embodiments, the "indication" is a flag, Boolean, or other value that indicates the first vehicle traversing the road, such as "Vehicle ID: 5; at road segment: 8."

In some embodiments, receiving an indication that the traversing of the road is part of a route plan for the first vehicle includes the following operations. A user device may have requested a recommendation of a route to traverse from a first location to a second location. For instance, particular embodiments receive user input of a beginning and ending location. Responsively, some embodiments recommend a route, of a plurality of routes, to traverse from the first location to the second location based at least in part on the portion of the sensor data exceeding the threshold. For example, referring back to FIG. 2, some embodiments do not select or rank lower traversal on the road 302 because of the significant loss of traction historically experienced at the segment 302-2 of the road 302.

In some embodiments, the first vehicle at block 1608 excludes or is not a part of the one or more vehicles at block 1602. In some embodiments, the first vehicle does not include sensors to sample or detect at least some sensor data (e.g., accelerometer data), as described with respect to block 1602. In these embodiments, for example, block 1608 represents functionality that can occur well after the populating of the data structure at block 1606.

Per block 1610, some embodiments derive the data structure in response to the receiving of the indication at block 1608. For example, subsequent to the populating at block 1606, some embodiments store, in a computer storage address/location, the data structure and all of its populated values (e.g., an identifier of the segment and sensor data). At block 1610, some embodiments then access the data structure by doing an input/output read operation to the computer storage address/location responsive to receiving the indication at block 1608. Such access of the data structure provides the data necessary to provide/generate corresponding user interfaces (e.g., FIG. 2) and/or perform block 1612.

Per block 1612, some embodiments facilitate a modification of a vehicle operating condition based on the segment and the sensor data in the derived data structure. A "vehicle operating condition" as described herein refers any attribute or state that one or more vehicles (or components of the one or more vehicles) are currently in, were in, or capable of being in. For example, a vehicle operating condition can be or include the vehicle's speed, a particular gear that the vehicle is in, a suspension level that the vehicle is at, a tire inflation level of a tire of the vehicle, a particular driver seat (and/or passenger seat) setting (e.g., a particular angle that a longitudinal and lateral portion of a seat is angled at or the amount of air in the seat), a particular state that a brake pedal is in (e.g., depressed or not), a particular state that the steering wheel or horn is in, and/or the like.

Accordingly, some embodiments facilitate a modification or change of the vehicle operation condition based on the segment and the sensor data in the derived data structure. For example, "facilitating a modification" of the vehicle operation condition can include sending a control signal to a vehicle, which directly and automatically causes the vehicle to change any of the vehicle operating conditions described above. In an illustrative example, based on the sensor data for a first segment indicating that there were sudden spikes in accelerometer readings over a threshold (indicating a low road safety score), some embodiments send a control signal to an autonomous vehicle, which causes the autonomous vehicle to slow down to some predetermined speed or percentage based on the speed the driver is currently driving at and the speed limit. In another example, based on this sensor data exceeding the threshold, some embodiments send a control signal to a device in the vehicle that causes the suspension mode or level of the vehicle to automatically adjust directly proportional to the spike in accelerometer readings.

In other embodiments, however, "facilitating a modification of a vehicle operation condition" alternatively or additionally includes sending a notification to a user device associated with a user or driver. In these embodiments, the user is directly responsible for causing the vehicle to change any of the vehicle operating conditions described above. For example, some embodiments cause presentation, at a user interface of a user device, of an indicator associated with the portion of the sensor data exceeding the threshold. In an illustrative example, referring back to FIG. 3, such "indicator" can be the indicia or window "There is significant loss of traction at this point in the road." The user may then to choose a different route or otherwise modify the vehicle operation condition in some way.

Figure 17:
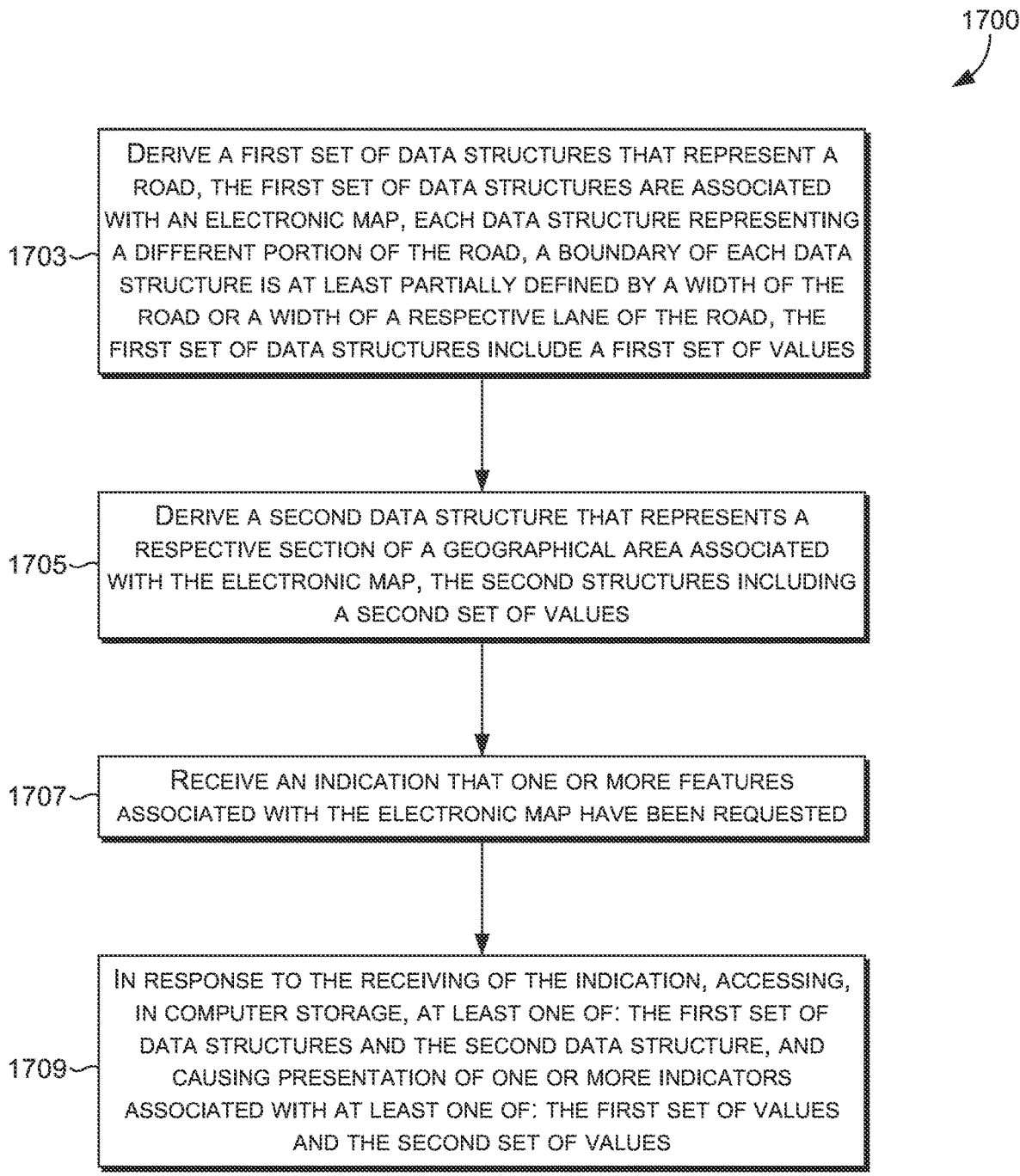
FIG. 17 is a flow diagram of an example process for accessing one or more data structures to complete a request associated with an electronic map, according to some embodiments.

FIG. 17 is a flow diagram of an example process 1700 for accessing one or more data structures to complete a request associated with an electronic map, according to some embodiments. In some embodiments, the process 1700 occurs subsequent to or automatically in response to the process 1600 of FIG. 16 and the data structures represent the same data structures (e.g., the data structure populated at block 1606 of FIG. 16). Per block 1703, some embodiments derive a first set of data structures that represent a road, the first set of data structures being associated with an electronic map, each data structure representing a different portion of the road, and a boundary of each data structure is at least partially defined by a width of the road or a width of a respective lane of the road, where each of the first set of data structures includes a respective first set of values. To "derive" any data structure (e.g., a road segment data structure or a grid data structure) can mean to generate the data structure, such as at program build time or to access or receive it, such as via calling it via an API at run-time (e.g., in response to a user request).

In some embodiments, any of the first set of data structures represent any of the road segment data structures described herein. Such data structures can include any structure features described with respect to FIG. 4 through FIG. 8. An example illustration that describes the boundary being defined by a width of a respective lane is described with respect to FIG. 4, where, for example, road segment data structure 408 is defined by an indicator representing the street side or shoulder of the street 402, which extends laterally to a lane divider indicator 402-2. An example illustration that describes the boundary being defined by a width of the road is described with respect to FIG. 5, where, for example, each road segment data structure may span the entire width of the road.

In some embodiments, the first set of values (e.g., of one or more attributes) included in each of the first set of data structures includes one or more of the following for a first section of the road: a vehicle efficiency score for the first section, a vehicle wear and tear score for the first section, a road flow score for the first section, a road comfort score for the first section, a road safety score for the first section, an air suspension mode score for the first section, one or more geo-coordinates of the first section, lane identifier that identifies one or more lanes of the first section, a direction of traffic flow of the one or more lanes, an indication of whether the first section is part of an off-road path or is part of a street, and a difficulty score of the first section. Each of these scores are described with respect to FIG. 7.

In some embodiments, each of these scores and values are determined per road segment data structure of a single road. Alternatively or additionally, these scores and values are determined for multiple roads or multiple road segment data structures together. For example, referring back to FIG. 9, any of the scores described above can be generated for the entire road segment corresponding to all of the road segment data structures between data points 904 and 922.

In some embodiments, each road segment data structure is a quadrilateral data structure that includes at least 4 vertices (or 3 vertices in a polygon) that partially define boundaries of the quadrilateral data structure, where the quadrilateral data structure represents a quadrilateral portion of the road. In some embodiments, this includes or is represented by what is described with respect to FIG. 7. In some embodiments, each vertex, of the 4 (or 3) vertices, is addressable by unique geo-coordinates, where each quadrilateral data structure embeds at least one of: a value indicating direction of traffic flow, a lane identifier that identifies a lane, and values indicating neighboring quadrilateral data structures that are above each quadrilateral data structure and below each quadrilateral data structure, as described, for example, with respect to FIG. 7. And the road segment data structure component 207 of FIG. 2. In some embodiments, each quadrilateral data structure includes a vertex that defines a mid-point of the quadrilateral data structure, where each quadrilateral data structure is a three-dimensional data structure such that each vertex includes latitude, longitude, and altitude values. Such three-dimensional data structure can represent and include the three dimensional data structure, as described with respect to FIG. 8. In some embodiments, such vertex that defines a mid-point can represent any one of the vertex 710, 712, or 714 of FIG. 7.

In some embodiments, each road segment data structure is tagged or populated with the corresponding first set of values based on sensor data and the deriving of the plurality of road segment data structures as described, for example, with respect to block 1608 of FIG. 16. The sensor data may be detected via one or more sensors coupled to a plurality of vehicles as the plurality of vehicles traverse the road, as described, for example, with respect to 1602 of FIG. 16. In some embodiments, such plurality of vehicles represent one of: a fleet of logistics vehicles that are configured to deliver or pickup parcels, or a group of vehicles of a same brand that are driven by customer (or testing driver), as described, for example, with respect to the vehicle sensor data collection component 205 of FIG. 2.

Per block 1705, some embodiments derive a second data structure that represents a respective section of a geographical area associated with the electronic map, where the second data structure includes a second set of values (e.g., of a second set of attributes). In some embodiments, such second data structure represents a grid data structure. A "grid data structure" does not denote a particular shape, such as a grid. Rather, a grid data structure can be rectangular, triangular, diamond, or any other suitable shape. In some embodiments, more than one grid data structure is derived, corresponding to different geographical areas.

In some embodiments, each grid data structure is tagged or populated with the corresponding second set of values based on sensor data and the deriving of the grid data structures as described, for example, with respect to block 1608 of FIG. 16. The sensor data may be detected via one or more sensors coupled to a plurality of vehicles as the plurality of vehicles traverse the corresponding geographical area, as described, for example, with respect to 1602 of FIG. 16. In some embodiments, such plurality of vehicles represent one of: a fleet of logistics vehicles that are configured to deliver or pickup parcels, or a group of vehicles of a same brand that are driven by customer (or testing driver), as described, for example, with respect to the vehicle sensor data collection component 205 of FIG. 2.

In some embodiments, the deriving of the second data structure includes receiving a first data structures that represents a first section of the geographical area, where the second set of values at least partially indicate that the first section includes an off-road section of the geographical area. In some embodiments, an "off-road section" refers to any portion of a geographical area where at least one vehicle has traversed but that does not include any on-road roads. For example, an off-road section can refer to or include one or more off-road roads or paths (e.g., unmarked dirt roads). In some embodiments, an "off-road section" alternatively refers to any portion of a geographical area that includes no on-road roads (e.g., includes mountains, trees, shrubbery, and the like).

In some embodiments, the second set of values inside the second data structure includes one or more of: an identifier that identifies the first grid data structure, a direction identifier, a timestamp indicating when a first value of the second set of values were first generated and when a second value of the second set of values were last generated, geo-coordinates of the center point of the first section, a location type value, and altitude of the first section, a quantity of times data was added to the first grid data structure, and vehicle identifiers that have traversed the first section and that are responsible for respective sets of the second set of attributes. Such attributes are described, for example, with respect to tables 4 and 5 herein.

In some embodiments, the geographical area represents and entire surface of the earth, as at least partially represented, for example, in the electronic map 1100 of FIG. 11. Accordingly, in these embodiments, each grid data structure represents a different section of the earth, where the plurality of grid structures together represent the entire surface of the earth. In other words, for example, each forest, neighborhood, ocean, city, and the like on earth can be split up into different sections that each represent a different section of the earth.

In some embodiments, after the first set of data structures and the second data structure has been tagged or otherwise populated with the first and second set of values respectively, the respective data structures are stored in computer storage so that they can be accessed later based on a user request, as described with respect to block 1707 and 1709.

Per block 1707, some embodiments receive an indication that one or more features associated with the electronic map have been requested. Such request can be or include any suitable user route finding or other request. Such request can alternatively or additionally include any automated or program request that calls for one or more data structures via an API. For example, in some embodiments, block 1707 includes receiving an indication that a user has requested a recommendation of a route to traverse from a first location (e.g., an address) to a second location (e.g., a second address). For instance, a user may input an address in an address field and the request may be initiated. Responsively, some embodiments recommend at least one route, of a plurality of routes, to traverse from the first location to the second location based at least in part on the first set of values and/or the second set of values such that the causing presentation step at block 1709 includes an indication (e.g., a highlighted route) of the recommended route to get from the first location to the second location. Alternatively, indicators associated with the first set of values and second set of values can be returned without respect to the recommendation (e.g., "this recommended route has a low road comfort score").

In some embodiments, block 1707 includes receiving an indication that a user has defined or requested the boundaries (e.g., a geofence, road section, neighborhood, an address, or route) for the data points that she is interested in. For example, referring back to FIG. 9, the user may define a road segment representing a section of the road 902 from data point 904 to 922.

In some embodiments, block 1707 includes receiving an indication that the user has requested some specific attribute data associated with the first set of values and/or the second set of values. For example, referring back to FIG. 3, the user may have requested a traction score for a particular road. In some embodiments, block 1707 includes receiving any indication that an electronic map feature (e.g., button, drop-down menu, or other user interface feature) or electronic map application has been activated (e.g., an app has been opened) or selected.

Per block 1709, in response to the receiving of the indication at block 1707, some embodiments access (e.g., fetch), in computer storage (e.g., RAM, cache, or non-volatile disk), at least one of: the first set of data structures and the second data structure and cause presentation of one or more indicators associated with at least one of: the first set of values and the second set of values. For example, using the illustrations above for block 1707, in response to receiving an indication that a user has requested a recommendation of a route to traverse from a first location (e.g., an address) to a second location (e.g., a second address), and calculating the recommendation, particular embodiments cause presentation of a color-coded recommended route indicator (the indicator), which is calculated based on a comfort score, road safety score, or the like. In some embodiments such presentation can alternatively or additionally include the popup window 310 (the indicator) indicating that one or more roads of the route are associated with significant loss of traction, or any other score, such as a low comfort score, a high road safety score, or the like.

In another example, in response to receiving an indication that a user has defined or requested the boundaries (e.g., a geofence, a road section, a neighborhood, an address, or route) for the data points that she is interested in, particular embodiments cause presentation of the screenshot 900 of the electronic map (the indicator) of FIG. 9 and/or the screenshot 300 of the electronic map of FIG. 3 (or with similar scores, such as road comfort, road safety, vehicle efficiency, vehicle wear and tear, road flow, etc.).

In another example, in response to receiving an indication that the user has requested some specific attribute data (e.g., via a selection of a traffic score (or any other score) button), associated with the first set of values and/or the second set of values, particular embodiments cause presentation of 310 of the screenshot 300 of FIG. 3. For example, referring back to FIG. 3, the user may have requested a traction score for a particular road. In another example, in response to receiving an indication that the user has opened a mapping application or selected some button, particular embodiments cause presentation of the location type, unique count, plus_code, or anything else described by table 4.

In some embodiments, the "access" of the first set of data structures and/or the second data structure can occur via any suitable manner. For example, in some embodiments, the road segment data structures are nested inside the larger grid data structures because road segments are typically located in larger geographical areas. Accordingly, in response to the receiving of the request at block 1707, some embodiments first derive corresponding grid structures and the corresponding road segment data structures that are embedded therein. In some embodiments, the road segment data structures are the key data structures that APIs draw upon. As such, requests may be sourced from its enclosed grid data structures. In other words, a given road segment data structure may contain or otherwise be associated with N grid data structures. In an illustrative example, if a user requested historical data at block 1707 for road 1 between points A and B (similar to FIG. 9) and point A was located in a geographical area represented by a first grid data structure and point B was located in a different geographical area represented by a second grid data structure, then particular embodiments, would access both the first and second grid data structures, as well as all of the road segment data structures that make up the portion of the road between points A and B.

Similarly, a given grid data structure may contain or otherwise be associated with N roads and thus N road segment data structures. Accordingly, for example, if a user requested all historical data at block 1707 for a geographical area represented by a first grid data structure, particular embodiments, would access the first grid data structure, as well as all of the street segment data structures corresponding to portions of the street that are located within the geographical area represented by the first grid data structure.

In some embodiments, the causing presentation of the indicator at block 1709 includes causing presentation of a heat map at the user interface (e.g., in response to receiving an indication that the user has requested a road traversal frequency), where the heat map indicates a frequency that the vehicles have traversed the road. In some embodiments, block 1709 includes the functionality as described with respect to FIG. 13 and/or FIG. 14. In some embodiments, the causing presentation of the indicator at block 1709 includes causing presentation of a heat map at the user interface, where the heat map indicates where one or more charge events took place along the road. In some embodiments, block 1709 includes the functionality as described with respect to FIG. 15.

Figure 18:
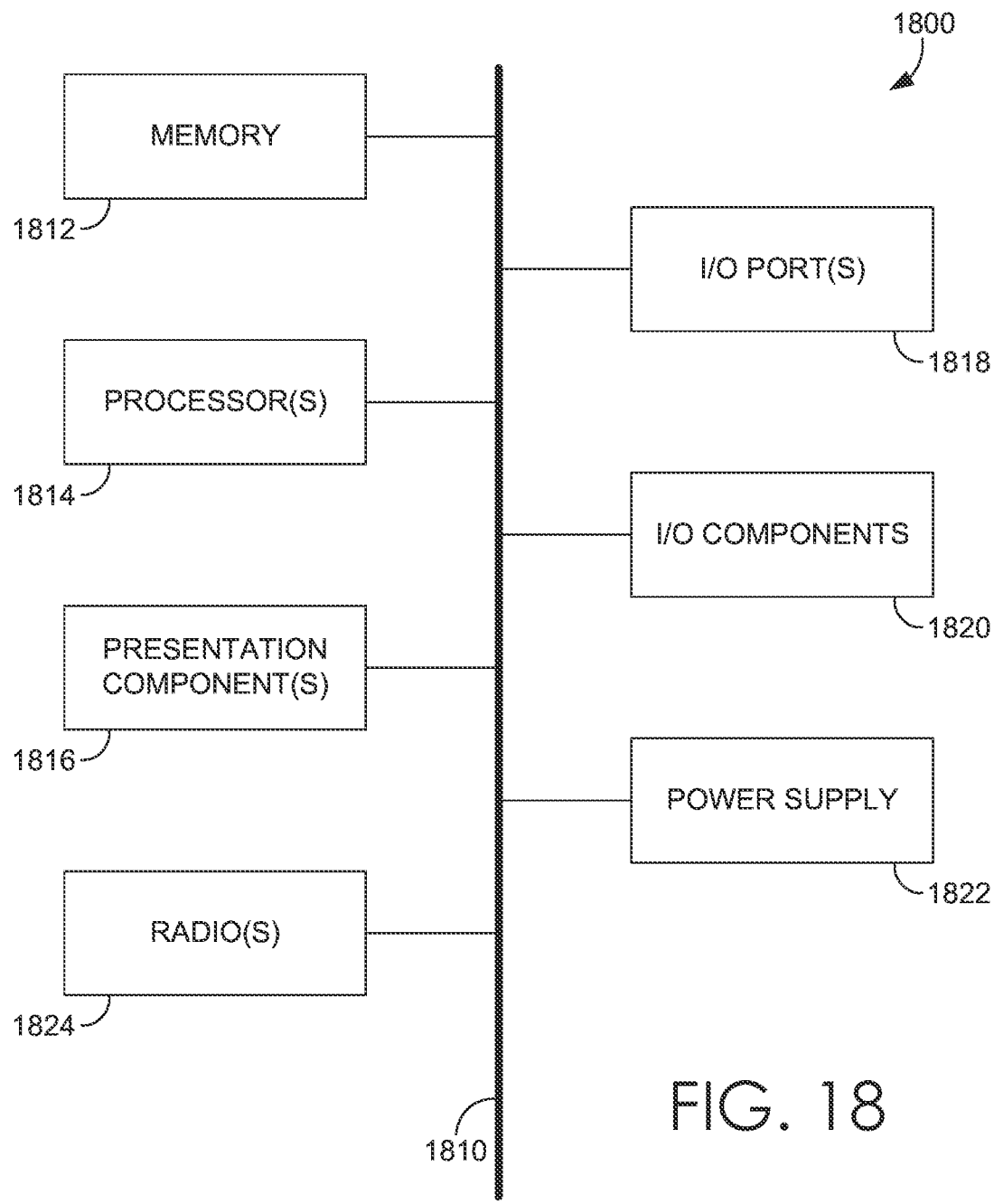
FIG. 18 is a block diagram of an example computing device, according to some embodiments.

Having described various implementations, an exemplary computing environment suitable for implementing embodiments of the disclosure is now described. With reference to FIG. 18, an exemplary computing device is provided and referred to generally as computing device 1800. The computing device 1800 is but one example of a suitable computing environment and is not intended to suggest any limitation as to the scope of use or functionality of embodiments of the disclosure. Neither should the computing device 1800 be interpreted as having any dependency or requirement relating to any one or combination of components illustrated. In some embodiments, the computing device 1800 represents the architecture of the computing device(s) 105, the user device(s) 150, and/or a computing device coupled to the sensor(s) 120-1 of the vehicles of FIG. 1.

Turning to FIG. 18, computing device 1800 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 18 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 18 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 18 and with reference to "computing device."

Computing device 1800 typically includes a variety of computer-readable media. Computer-readable media can be any available media that can be accessed by computing device 1800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 1800 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 1800 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1800. The computing device 1800 may be equipped with depth cameras, such as stereoscopic camera systems, infrared camera systems, RGB camera systems, and combinations of these, for gesture detection and recognition. Additionally, the computing device 1800 may be equipped with accelerometers or gyroscopes that enable detection of motion. The output of the accelerometers or gyroscopes may be provided to the display of the computing device 1800 to render immersive augmented reality or virtual reality.

Some embodiments of computing device 1800 may include one or more radio(s) 24 (or similar wireless communication components). The radio 24 transmits and receives radio or wireless communications. The computing device 1800 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

The following clauses represent exemplary aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are exemplary in nature and are not limiting.

In some embodiments, a system, such as the system described in any of the embodiments above, comprises at least one computer processor to perform operations comprising: receiving, via one or more sensors coupled to one or more vehicles, sensor data based on the one or more vehicles traversing a road in a geographical area; determining that a portion of the sensor data exceeds a threshold, the portion of the sensor data being associated with a segment of the road; detecting geo-coordinates associated with the segment of the road; based at least in part on the detecting of the geo-coordinates, populating a data structure that indicates the segment and the portion of the sensor data exceeding the threshold; receiving an indication that a first vehicle is traversing the road or that traversing the road is part of a route plan for the first vehicle; in response to the receiving of the indication, deriving the data structure; and facilitating a modification of a vehicle operating condition based on the segment and the sensor data in the derived data structure.

In any combination of the above embodiments of the system, the facilitating of the modification includes causing presentation, at a user interface of a user device, of an indicator associated with the portion of the sensor data exceeding the threshold.

In any combination of the above embodiments of the system, the data structure is a grid data structure that represents the geographical area.

In any combination of the above embodiments of the system, the data structure is a road segment data structure that represents the segment of the road.

In any combination of the above embodiments of the system, the operations further comprising: generating a score based on the determining, and wherein the score is included in the populating of the data structure that indicates the portion of the sensor data exceeding the threshold, and wherein the score includes one or more of: a vehicle efficiency score for the segment, a vehicle wear and tear score for the segment, a road flow score for the segment, a road comfort score for the segment, a road safety score for the segment, a suspension mode score for the segment, one or more geo-coordinates of the segment, lane identifier that identifies one or more lanes of the segment, a direction of traffic flow of the one or more lanes, an indication of whether the segment is part of an off-road path or is part of a street, and a difficulty score of the segment.

In any combination of the above embodiments of the system, the data structure is a quadrilateral data structure that include a boundary that defines a width of a lane of the road.

In any combination of the above embodiments of the system, the quadrilateral data structure includes at least 4 vertices that partially define boundaries of the quadrilateral data structure, and wherein the quadrilateral data structure includes a vertex that defines a mid-point of the quadrilateral data structure, and wherein the quadrilateral data structure is three-dimensional data structure such that each vertex includes latitude, longitude, and altitude values associated with the geo-coordinates.

In any combination of the above embodiments of the system, the operations further comprising causing presentation of a heat map at a user interface, the heat map indicating frequency that a plurality of vehicles have traversed the road.

In any combination of the above embodiments of the system, the operations further comprising causing presentation of a heat map at a user interface, the heat map indicating where a charge event took place along the road.

In any combination of the above embodiments of the system, the receiving of the indication is based on a user having requested a recommendation of a route to traverse from a first location to a second location, and wherein the at least one computer processor performs further operations comprising: recommending a route, of a plurality of routes, to traverse from the first location to the second location based at least in part on the portion of the sensor data exceeds the threshold; and causing presentation, at a user interface of a user device, of an indication of the recommended route.

In any combination of the above embodiments of the system, the one or more vehicles represent one of: a fleet of logistics vehicles that are configured to deliver or pickup parcels, or a group of vehicles of a same make that are driven by customers.

In some embodiments, a computer-implemented method, such as the computer-implemented method described in any of the embodiments above, comprises: receiving, via one or more sensors coupled to one or more vehicles, sensor data based on the one or more vehicles traversing a road in a geographical area; determining that a portion of the sensor data exceeds a threshold, the portion of the sensor data being associated with a segment of the road; detecting geo-coordinates associated with the segment of the road; populating a data structure that indicates the segment and the portion of the sensor data exceeding the threshold; receiving an indication that a first vehicle is traversing the road or that traversing the road is part of a route plan for the first vehicle; in response to the receiving of the indication, deriving the data structure; and facilitating a modification of a vehicle operating condition based on the segment and the sensor data in the derived data structure.

In any combination of the above embodiments of the computer-implemented method, the data structure is a grid data structure that represents the geographical area.

In any combination of the above embodiments of the computer-implemented method, the data structure is a road segment data structure that represents the segment of the road.

In any combination of the above embodiments of the computer-implemented method, further comprising: generating a score based on the determining, and wherein the score includes one or more of: a vehicle efficiency score for the segment, a vehicle wear and tear score for the segment, a road flow score for the segment, a road comfort score for the segment, a road safety score for the segment, a suspension mode score for the segment, one or more geo-coordinates of the segment, lane identifier that identifies one or more lanes of the segment, a direction of traffic flow of the one or more lanes, an indication of whether the segment is part of an off-road path or is part of a street, and a difficulty score of the segment.

In any combination of the above embodiments of the computer-implemented method, the data structure is a quadrilateral data structure that includes at least 4 vertices that partially define boundaries of the quadrilateral data structure, and wherein the quadrilateral data structure represents a quadrilateral portion of the road.

In any combination of the above embodiments of the computer-implemented method, the quadrilateral data structure includes a vertex that defines a mid-point of the quadrilateral data structure, and wherein the quadrilateral data structure is three-dimensional data structure such that each vertex includes latitude, longitude, and altitude values associated with the geo-coordinates.

In any combination of the above embodiments of the computer-implemented method, the one or more vehicles represent one of: a fleet of logistics vehicles that are configured to deliver or pickup parcels, or a group of vehicles of a same make that are driven by customers.

In some embodiments, one or more computer storage media, as described herein, has computer-executable instructions embodied thereon that, when executed, by one or more processors, cause the one or more processors to perform operations comprising: receiving, via one or more sensors coupled to one or more vehicles, sensor data associated with a road; determining that a portion of the sensor data exceeds a threshold, the portion of the sensor data being associated with a segment of the road; detecting geo-coordinates associated with the segment of the road; populating a data structure that indicates the portion of the sensor data exceeding the threshold; receiving an indication that a first vehicle is traversing the road or that traversing the road is part of a route plan for the first vehicle; in response to the receiving of the indication, deriving the data structure; and facilitating a modification of a vehicle operating condition based on at least one of: the segment and the sensor data in the derived data structure.

In any combination of the above embodiments of the one or more computer storage media, the data structure includes at least one of: a grid data structure and a road segment data structure.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 0, 1, 2, 3, . . . N objects and/or elements, where N is a positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

What is claimed is:

1. A system comprising:
at least one computer processor to perform operations comprising:
receiving, via one or more sensors coupled to one or more vehicles, sensor data based on the one or more vehicles traversing a road in a geographical area;
determining that a sensor value from the sensor data of one of the one or more sensors exceeds a sensor value threshold for that sensor, the sensor value received in a portion of the sensor data associated with a segment of the road;
receiving geo-coordinates associated with the segment of the road;
based at least in part on the geo-coordinates, populating a data structure that indicates the segment and the portion of the sensor data exceeding the sensor value threshold;

receiving an indication that a first vehicle is traversing the road or that traversing the road is part of a route plan for the first vehicle;

in response to the receiving of the indication, deriving the data structure; and providing information to the first vehicle, for use in causing a modification of a vehicle operating condition, based on the segment and the sensor data in the derived data structure, wherein the data structure is a quadrilateral data structure that include includes a boundary that defines a width of a lane of the road.

2. The system of claim 1, wherein the causing of the modification includes causing presentation, at a user interface of a user device, of an indicator associated with the portion of the sensor data exceeding the sensor value threshold.

3. The system of claim 1, wherein the data structure is a grid data structure that represents the geographical area.

4. The system of claim 1, wherein the data structure is a road segment data structure that represents the segment of the road.

5. The system of claim 1, the operations further comprising: generating a score based on the determining, and wherein the score is included in the populating of the data structure that indicates the portion of the sensor data exceeding the sensor value threshold, and wherein the score includes one or more of: a vehicle efficiency score for the segment, a vehicle wear and tear score for the segment, a road flow score for the segment, a road comfort score for the segment, a road safety score for the segment, a suspension mode score for the segment, the one or more geo-coordinates associated with the segment, a lane identifier that identifies one or more lanes of the segment, a direction of traffic flow of the one or more lanes, an indication of whether the segment is part of an off-road path or is part of a street, and a difficulty score of the segment.

6. The system of claim 1, wherein the quadrilateral data structure includes at least four vertices that partially define boundaries of the quadrilateral data structure, and wherein the quadrilateral data structure includes a vertex that defines a mid-point of the quadrilateral data structure, and wherein the quadrilateral data structure is three-dimensional data structure such that each vertex includes latitude, longitude, and altitude values associated with the geo-coordinates.

7. The system of claim 1, the operations further comprising causing presentation of a heat map at a user interface, the heat map indicating a frequency with which a plurality of vehicles have traversed the road.

8. The system of claim 1, the operations further comprising causing presentation of a heat map at a user interface, the heat map indicating where a charge event took place along the road.

9. The system of claim 1, wherein the receiving of the indication is based on a user having requested a recommendation of a route to traverse from a first location to a second location, and wherein the at least one computer processor performs further operations comprising:

recommending a route, of a plurality of routes, to traverse from the first location to the second location based at least in part on the sensor value that exceeds the sensor value threshold; and causing presentation, at a user interface of a user device, of an indication of the recommended route.

10. The system of claim 1, wherein the one or more vehicles represent one of: a fleet of logistics vehicles that are configured to deliver or pickup parcels, or a group of vehicles of a same make that are driven by customers.

11. A computer-implemented method comprising:

receiving, via one or more sensors coupled to one or more vehicles, sensor data based on the one or more vehicles traversing a road in a geographical area;

determining that a sensor value from the sensor data of one of the one or more sensors exceeds a sensor value threshold for that sensor, the sensor value received in a portion of the sensor data associated with a segment of the road;

detecting geo-coordinates associated with the segment of the road;

populating a data structure that indicates the segment and the portion of the sensor data exceeding the sensor value threshold;

receiving an indication that a first vehicle is traversing the road or that traversing the road is part of a route plan for the first vehicle;

in response to the receiving of the indication, deriving the data structure; and providing information to the first vehicle, for use in causing a modification of a vehicle operating condition, based on the segment and the sensor data in the derived data structure, wherein the data structure is a quadrilateral data structure that includes at least four vertices that partially define boundaries of the quadrilateral data structure, and wherein the quadrilateral data structure represents a quadrilateral portion of the road.

12. The computer-implemented method of claim 11, wherein the data structure is a grid data structure that represents the geographical area.

13. The computer-implemented method of claim 11, wherein the data structure is a road segment data structure that represents the segment of the road.

14. The computer-implemented method of claim 11, further comprising: generating a score based on the determining, and wherein the score includes one or more of: a vehicle efficiency score for the segment, a vehicle wear and tear score for the segment, a road flow score for the segment, a road comfort score for the segment, a road safety score for the segment, a suspension mode score for the segment, the one or more geo-coordinates associated with the segment, a lane identifier that identifies one or more lanes of the segment, a direction of traffic flow of the one or more lanes, an indication of whether the segment is part of an off-road path or is part of a street, and a difficulty score of the segment.

15. The computer-implemented method of claim 11, wherein the quadrilateral data structure includes a vertex that defines a mid-point of the quadrilateral data structure, and wherein the quadrilateral data structure is three-dimensional data structure such that each vertex includes latitude, longitude, and altitude values associated with the geo-coordinates.

16. The computer-implemented method of claim 11, wherein the one or more vehicles represent one of: a fleet of logistics vehicles that are configured to deliver or pickup parcels, or a group of vehicles of a same make that are driven by customers.

17. One or more non-transitory computer storage media having computer-executable instructions embodied thereon that, when executed, by one or more processors, cause the one or more processors to perform operations comprising:

receiving, via one or more sensors coupled to one or more vehicles, sensor data associated with a road;

determining that a sensor value from the sensor data of one of the one or more sensors exceeds a sensor value threshold for that sensor, the sensor value received in a portion of the sensor data being associated with a segment of the road;

receiving geo-coordinates associated with the segment of the road;

populating a data structure that indicates the portion of the sensor data exceeding the sensor value threshold;

receiving an indication that a first vehicle is traversing the road or that traversing the road is part of a route plan for the first vehicle;

in response to the receiving of the indication, deriving the data structure;

providing information to the first vehicle, for use in causing a modification of a vehicle operating condition, based on at least one of: the segment and the sensor data in the derived data structure; and causing presentation of a heat map at a user interface, the heat map indicating a frequency with which a plurality of vehicles have traversed the road.

18. The one or more non-transitory computer storage media of claim 17, wherein the data structure includes at least one of: a grid data structure and a road segment data structure.

* * * * *

UNITED STATES PATENT AND TRADEMARK OFFICE
CERTIFICATE OF CORRECTION

PATENT NO. : 12,320,667 B2
APPLICATION NO. : 18/091168
DATED : June 3, 2025
INVENTOR(S) : Philipp W. Beisel It is certified that error appears in the above-identified patent and that said Letters Patent is hereby corrected as shown below:

In the Claims

Column 43, Line No. 10 (Claim 1): Replace "that include includes a", with --that includes a--;

Column 45, Line No. 2 (Claim 17): Replace "data being associated", with --data associated--.

Signed and Sealed this
Twelfth Day of August, 2025

Coke Morgan Stewart
*Acting Director of the United States Patent and Trademark Office*